US009087218B1

(12) United States Patent
 Emigh

(10) Patent No.: US 9,087,218 B1
(45) Date of Patent: Jul. 21, 2015

(54) TRUSTED PATH

(76) Inventor: Aaron T. Emigh, Incline Village, NV (US)

( * ) Notice: Subject to any disclaimer, the term of this patent is extended or adjusted under 35 U.S.C. 154(b) by 2802 days.

(21) Appl. No.: 11/502,907

(22) Filed: Aug. 11, 2006

Related U.S. Application Data

(60) Provisional application No. 60/707,566, filed on Aug. 11, 2005.

(51) Int. Cl.
*G06F 21/30* (2013.01)
*G06F 21/70* (2013.01)

(52) U.S. Cl.
CPC ...................................... *G06F 21/70* (2013.01)

(58) Field of Classification Search
USPC .......................... 713/155, 161, 170; 726/5, 29
See application file for complete search history.

(56) References Cited

U.S. PATENT DOCUMENTS

| | | | |
|---|---|---|---|
| 4,885,789 A | 12/1989 | Burger et al. | |
| 4,918,653 A | 4/1990 | Johri et al. | |
| 4,945,468 A | 7/1990 | Carson et al. | |
| 5,590,266 A | 12/1996 | Carson et al. | |
| 5,596,718 A | 1/1997 | Boebert et al. | |
| 5,822,435 A | 10/1998 | Boebert et al. | |
| 6,021,496 A | 2/2000 | Dutcher et al. | |
| 6,141,760 A | 10/2000 | Abadi et al. | |
| 6,389,535 B1 | 5/2002 | Thomlinson et al. | |
| 6,496,930 B1 | 12/2002 | Ono et al. | |
| 6,507,909 B1 | 1/2003 | Zurko et al. | |
| 6,618,809 B1 | 9/2003 | Wettergren | |
| 6,636,248 B1 | 10/2003 | Christensen et al. | |
| 6,871,283 B1 | 3/2005 | Zurko et al. | |
| 2002/0067832 A1 | 6/2002 | Jablon | |
| 2003/0221110 A1 | 11/2003 | Kryvoruchko et al. | |
| 2004/0243806 A1 | 12/2004 | McKinley et al. | |
| 2005/0091213 A1 | 4/2005 | Schurz et al. | |
| 2005/0097354 A1 | 5/2005 | Zurko et al. | |
| 2005/0188210 A1 | 8/2005 | Perlin et al. | |
| 2005/0210263 A1 | 9/2005 | Levas et al. | |
| 2006/0053293 A1 | 3/2006 | Zager et al. | |
| 2006/0070126 A1* | 3/2006 | Grynberg | ........................ 726/22 |
| 2006/0123464 A1 | 6/2006 | Goodman et al. | |
| 2006/0225127 A1 | 10/2006 | Roberts et al. | |
| 2007/0005984 A1 | 1/2007 | Florencio et al. | |

OTHER PUBLICATIONS

U.S. Appl. No. 11/131,038, Emigh et al.
Jeffrey L. Berger et al, "Compartmented Mode Workstation: Prototype Highlights." IEEE Transactions on Software Engineering 16, 6, Jun. 1990.
Blake Ross et al, "A 'Simple' Solution to the Unique Password Problem." Presented at the 2004 Annual Stanford Affiliates' Meeting.
Audun Jøsang et al, "User Interface Requirements for Authentication of Communication." Proceedings of the Fourth Australian User Interface Conference on User Interfaces, vol. 18, Feb. 2003.

(Continued)

*Primary Examiner* — Eleni Shiferaw
*Assistant Examiner* — Paul Callahan

(57) ABSTRACT

In some embodiments, techniques for secure data entry comprise receiving a request for secure data entry associated with a data recipient; receiving an intended data recipient, and denying the request for secure data entry if it is determined that the data recipient does not match the intended data recipient.

30 Claims, 18 Drawing Sheets

(56) References Cited

OTHER PUBLICATIONS

Zishuang Ye et al, "Trusted Paths for Browsers." 11$^{th}$ Usenix Security Symposium, Aug. 2002.
Jeremy Epstein et al, "A High Assurance Window System Prototype." Journal of Computer Security 2, 2 (1994), pp. 159-190.
David A. Wheeler, "Secure Programming for Linux and Unix HOWTO," section 7.12, "Set up a Trusted Path." Version 3.010, Mar. 3, 2003, http://www.linux.org/docs/ldp/howto/Secure-Programs-HOWTO/trusted-path.html.
Microsoft Corporation, "The Essentials of Replacing the Microsoft Graphical Identification and Authentication Dynamic Link Library." Microsoft TechNet, Jun. 7, 2001, http://technet.microsoft.com/en-us/library/bb742447(printer).aspx.
Burt Kaliski, "Passwords Don't Get No Respect—Or, How to Make the Most of Weak Shared Secrets." DIMACS Workshop on Theft in E-Commerce, Apr. 14, 2005.
Blake Ross et al, "A Browser Plug-in Solution to the Unique Password Problem." Presented at the 14th Usenix Security Symposium, Jul. 31-Aug. 5, 2005.
Rachna Dhamija et al, "The Battle Against Phishing: Dynamic Security Skins." Proceedings of the 2005 ACM Symposium on Usable Privacy and Security, pp. 77-88.
Min Wu et al, "Users are not Dependable: How to make security indicators that protect them better." Presentation given at the first TIPPI workshop, Jun. 13, 2005.
U.S. Appl. No. 11/131,039, Emigh.
U.S. Appl. No. 11/502,906, Emigh.
Chou et al, "Client-side Defense Against Web-Based Identity Theft." 11$^{th}$ Annual Network and Distributed System Security Symposium (NDSS '04), San Diego, Feb. 2004.

* cited by examiner

TRUSTED PATH

CROSS REFERENCE TO RELATED APPLICATIONS

This application claims priority to U.S. Provisional Patent Application No. 60/707,566, entitled TRUSTED PATH AND ANTI-PHISHING, filed Aug. 11, 2005, which is incorporated herein by reference for all purposes.

FIELD OF THE INVENTION

The present invention relates generally to the area of computer security. More specifically, techniques for the secure entry of data are disclosed.

BACKGROUND OF THE INVENTION

Modern computer usage requires that data be provided to a variety of entities, both local and remote, such as over the internet. This has given rise to fraudulent obtaining of data, for example via identity theft such as "phishing." Current approaches do not effectively prevent this from occurring.

Existing ways to provide data do not provide a guarantee of who may obtain the data. Data may be misused by a party who should not have access to the data. Examples of such data include passwords, financial identifiers such as credit card numbers and bank account numbers, and personal information such as social security numbers and driver's license numbers. Additionally, input intercepting hardware and software such as keyloggers and screenloggers can compromise data.

Further complicating the task of providing security with respect to the intended recipient of data, users tend to ignore confirmation screens and automatically approve most actions that are called to their attention.

It would be useful to ensure that provided data is received and/or usable only by an intended recipient of the data. It would further be useful to do so in a manner that ensures that users have reviewed the intended data recipient in a meaningful manner.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
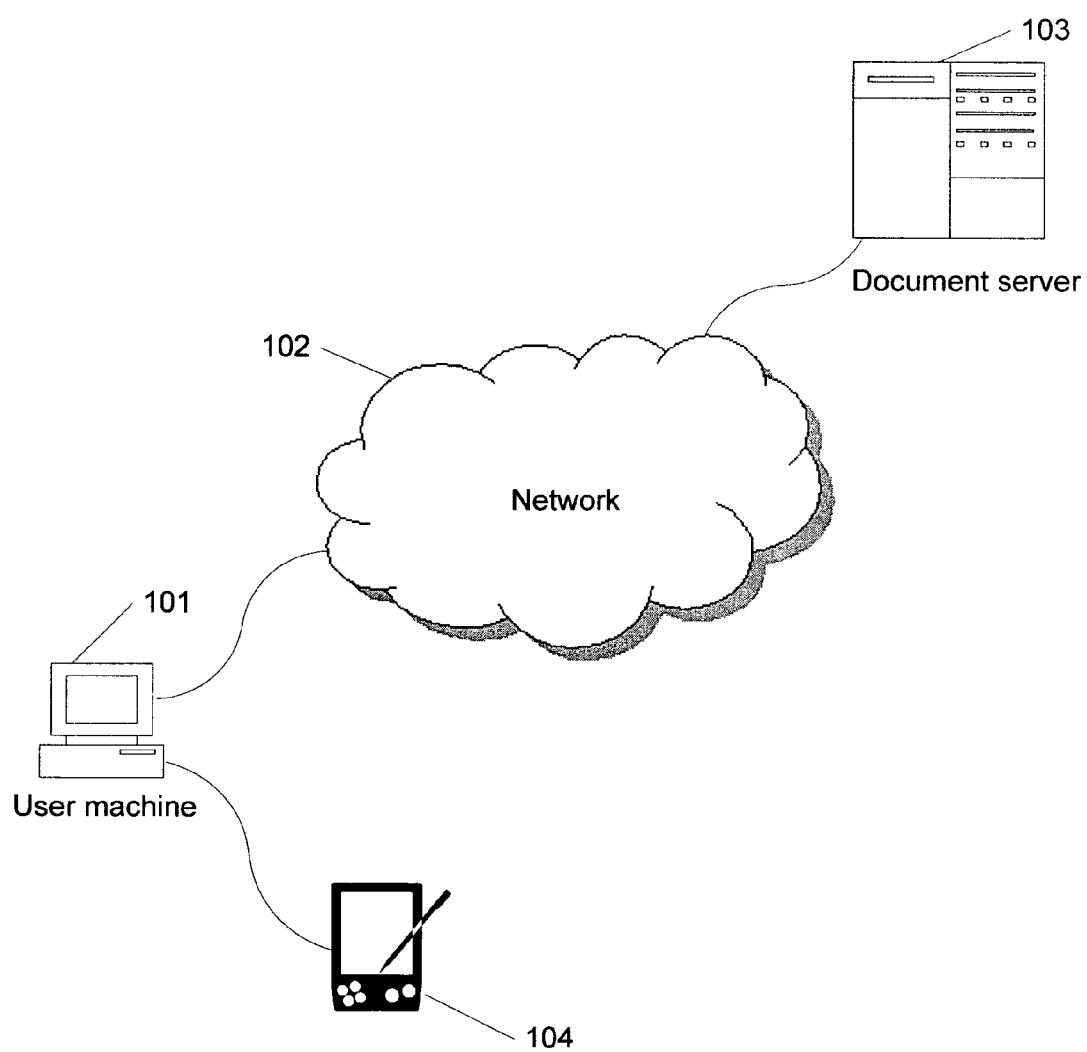
FIG. 1 is a diagram of a system for secure data entry, according to some embodiments.

FIG. 1 is a diagram of a system for secure data entry, according to some embodiments. In this example, a user machine 101 may be connected to a network 102. A user machine 101 may be any user-operated device capable of performing programmed information processing. Examples of a user machine 101 include a personal computer, a PDA, an internet appliance, and a cell phone. In some embodiments, a user machine 101 may receive a document through the network 102 from a document server 103. Examples of a document include a web page, a document in a page description language such as a PDF, a word processing document, a database document and a spreadsheet. A document may include an embedded request for secure data entry.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet.

A document server 103 may be connected to the network 102. The document server 103 may be any entity capable of providing a document, such as a web server that provides a document through a protocol such as HTTP. The document server 103 may provide a document that includes an embedded request for secure data entry. A document refers herein to any data that may be referenced by an address, including a file on a computer filesystem, an entry in a database table, a web page, and dynamically generated data provided by a server such as an HTTP server.

In some embodiments, an external secure data entry device 104 may be connected to a user machine 101, for example via a direct connection such as USB or via a network, for example a wireless network such as Bluetooth or 802.11. An external data entry device may be used to provide secure data entry services, for example as described in conjunction with FIG. 12.

Figure 2:
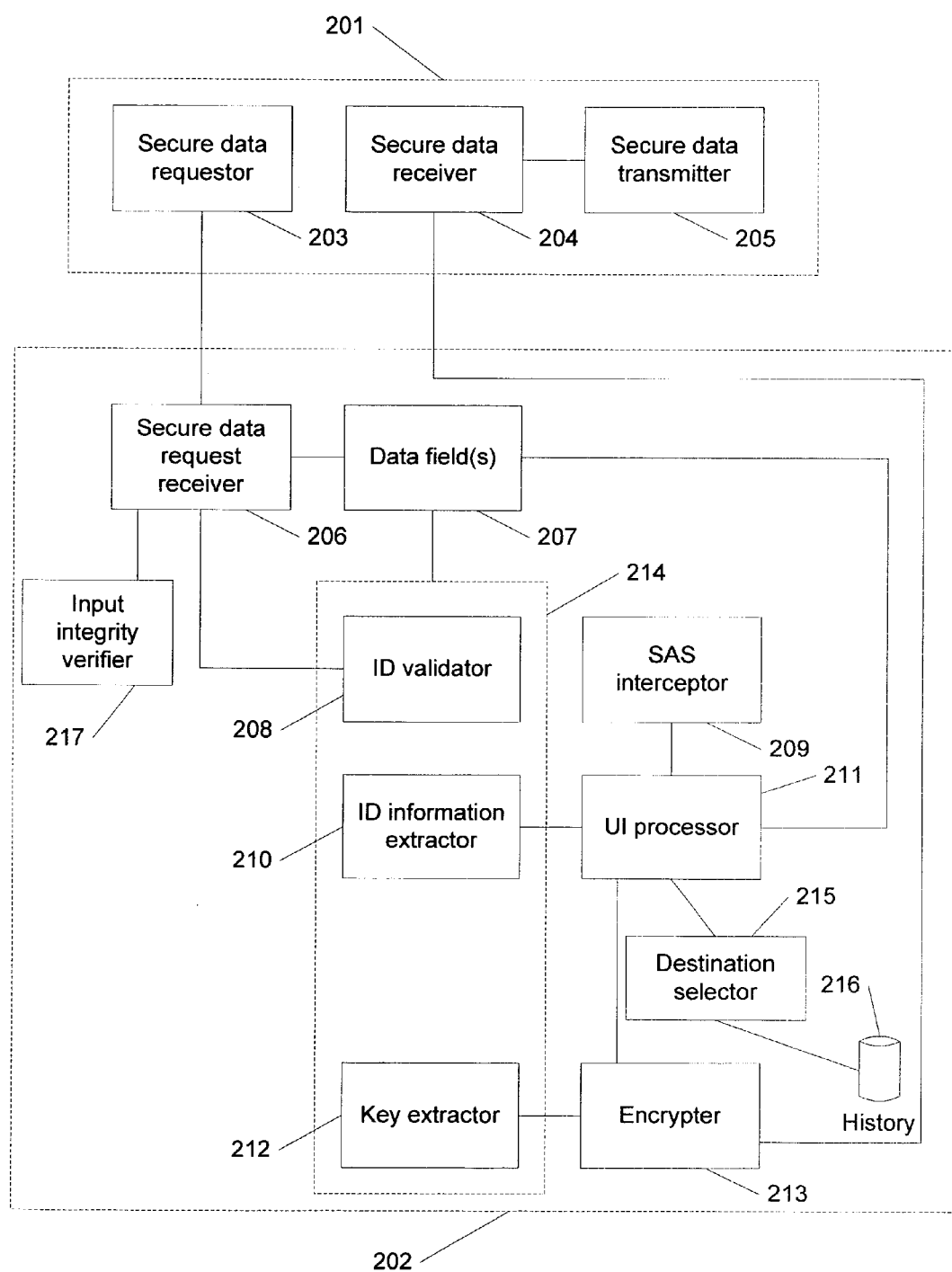
FIG. 2 is a diagram of a system for processing secure data entry, according to some embodiments.

FIG. 2 is a diagram of a system for processing secure data entry, according to some embodiments. In this example, a secure data entry requestor 201 requests secure data entry from a secure data entry provider 202. In some embodiments, a secure data entry requestor 201 and a secure data entry provider 202 may be associated with a user machine such as user machine 101 of FIG. 1. In some embodiments, a secure data entry requestor 201 may be associated with a document browser such as a web browser. In some embodiments, a secure data entry requestor 201 may be associated with an application program. In some embodiments, a secure data entry provider 202 may be associated with an operating system such as Windows, Unix, Linux, or MacOS. In some embodiments, a secure data entry provider 202 may be associated with a document browser such as a web browser. In some embodiments, a secure data entry provider 202, or portions of a secure data entry provider 202, may be associated with an external secure data entry device such as external secure data entry device 104 of FIG. 1. Examples of a secure data entry requestor 201 are discussed in conjunction with FIG. 6. Examples of a secure data entry provider 202 are discussed in conjunction with FIGS. 7 and 12.

A secure data requestor 203 may request that secure data entry be performed, for example by making an operating system call or a call to an application program interface, herein referred to as an API. An example of a secure data requestor 203 is discussed in conjunction with 603 of FIG. 6. A secure data receiver 204 may receive data that has been securely entered, for example through a callback function, a result returned from an API call, retrieving data from a predetermined or specified location, or any other way that data may be provided. A secure data transmitter 205 may transmit data that has been securely entered to a location associated with an owner of the data, such as a URL. In some embodiments, a secure data transmitter 205 may perform password-authenticated key agreement. In some embodiments (not shown), a secure data transmitter 205 may be associated with a secure data entry provider 202.

A secure data request receiver 206 may receive a specification for secure data entry, for example from a secure data requestor 203. A request for secure data entry may include identity information such as an X.509 certificate, for example as specified in section 4 of IETF RFC 3280, available from the Internet Engineering Task Force, and may include information associated with data for which secure data entry is requested, such as specifications of one or more data fields 207. Examples of receiving a request for secure data entry are discussed in conjunction with 701 of FIGS. 7 and 1201 of FIG. 12. One or more data fields 207 may be retained for presentation and input, for example in memory.

In some embodiments, an input integrity verifier 217 may verify the integrity of software and/or hardware associated with data input.

A request analyzer 214 may include components that extract and/or analyze request data such as identity information. An ID validator 208 may determine whether an identity associated with the request is valid. An example of determining whether an identity is valid is to determine whether an X.509 certificate specifying an identity contains a valid cryptographic signature from a trusted certificate authority. Another example of determining whether an identity is valid is to consult a reputation service.

An ID information extractor 210 may extract displayable ID information. An example of displayable ID information is a name associated with an entity associated with identity information, such as the "subject name" in an X.509 certificate. Another example of displayable ID information is a logotype and/or audio data associated with an entity associated with identity information, such as a "subject organization logotype" associated with an X.509 certificate, for example as specified in IETF RFC 3709, available from the Internet Engineering Task Force. In some embodiments, an ID information extractor 210 may obtain ID information from a reputation service.

A key extractor 212 may extract cryptographic key information, for example a public half of a public/private key pair or a key to be used in a keyed cryptographic hash. An example of cryptographic key information is the "subject public key info" field of an X.509 certificate. In some embodiments, a key extractor 212 may obtain cryptographic key information from a reputation service.

In some embodiments, a secure attention sequence (SAS) interceptor 209 may intercept a SAS. An example of a SAS is a predetermined or configurable input such as a key, key combination or sequence, for example CTRL-ALT-DEL. Another example of a SAS is an event from a separate input device, for example a button or an attachment to another device such as a mouse or monitor. In some embodiments, a SAS interceptor may be associated with a keyboard driver, a GINA (Windows Graphical Identification aNd Authentication dynamically-linked library), a Windows Credential Provider module, or a SAK (Linux Secure Attention Key). Details on writing keyboard drivers, GINAs and SAK handlers are well known to those skilled in the art, and are available from operating systems vendors such as Microsoft. In some embodiments, a SAS interceptor may be associated with an application program, or a component of an application program such as a keyboard event handler.

A UI processor 211 may provide a user interface, which may include identity-related information such as displayable information extracted by an ID information extractor 210, and which may include one or more data fields 207, which may provide a way for a user to securely enter one or more inputs. In some embodiments, a UI processor 211 may provide a user interface associated with reserved real estate. In some embodiments, a UI processor 211 may include or communicate with a destination selector 215, which may provide a way to select or input an intended destination. In some embodiments, a destination selector 215 may reference a history 216, which may for example include information about previously selected destinations.

In some embodiments, an encrypter 213 may encrypt data. Data that may be encrypted includes data that has been input into the UI processor 211, and optionally predetermined data that may be associated with data fields 207. In some embodiments, an encrypter 213 may encrypt data using one or more keys provided by a key extractor 212, and/or one or more keys associated with data fields 207. In some embodiments, an encrypter 213 may combine data fields prior to encrypting, for example by combining input data with static data. An encrypter 213 may provide encrypted data to a secure data receiver 204.

Figure 3:
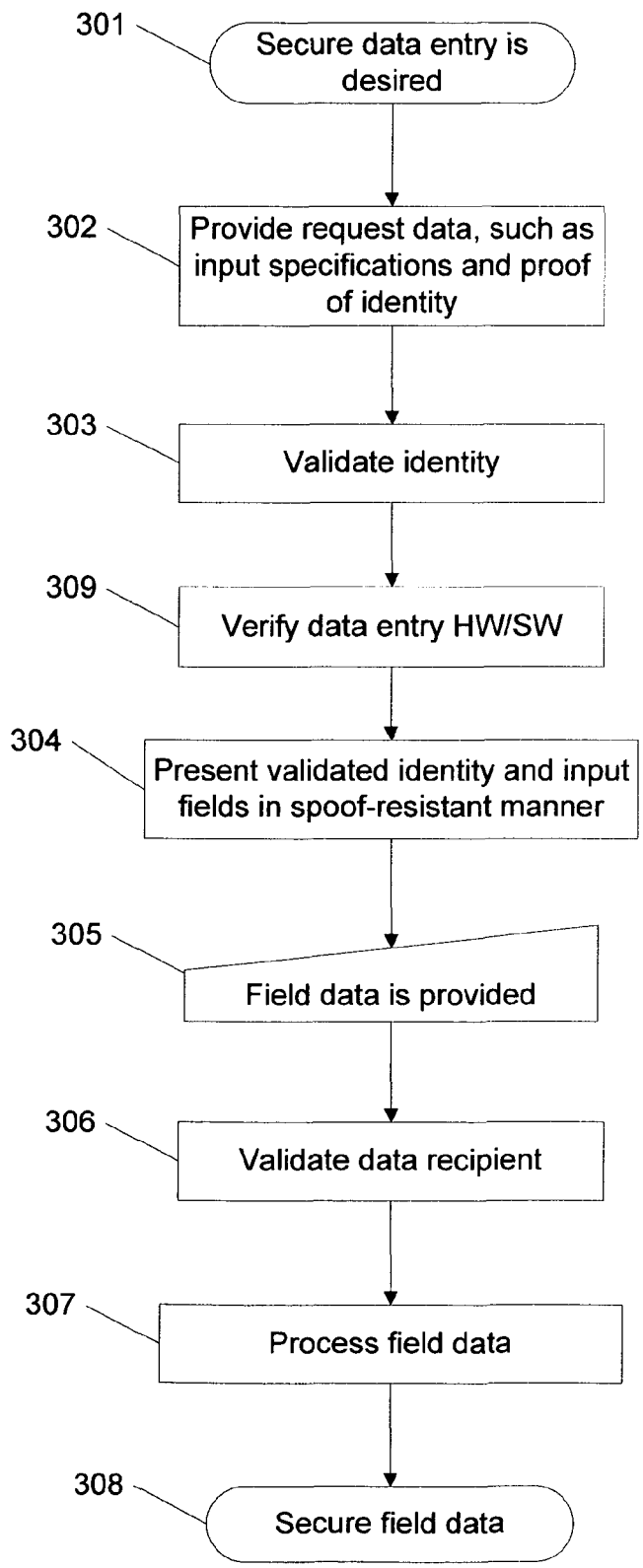
FIG. 3 is a flow diagram of a method for secure data entry, according to some embodiments.

FIG. 3 is a flow diagram of a method for secure data entry, according to some embodiments. In this example, secure data entry is desired (301). An example of a reason secure data entry may be desired is because a document such as a web page has specified secure data entry. One example of a document specification of secure data entry is for an element of a document, such as an element associated with a script such as a Javascript, to programmatically request secure data entry, for example through a programmatic interface such as an ActiveX component. Another example of a document specification of secure data entry is the use of a predetermined indicator, for example a modification to a FORM field in an HTML document that indicates that secure data entry is desired. An example of a modification to a FORM field is <FORM SECURE="yes" ACTION="<url>" . . . >, wherein the value "yes" in the SECURE field indicates that secure data entry is desired for contents of the form. Another example of a document specification of secure data entry is a semantic indication that a field contains confidential data, such as a password, which may for example be indicated via an <INPUT TYPE="password" . . . > field in an HTML document. Another example of a reason secure data entry may be desired is because an application desires secure data entry. An example of an application that may desire secure data entry is an application that requires confidential information, such as a password, or a password to an external service. An example of an application that may require a password to an external service is an application that manages finances, such as Quicken, which may for example use banking and/or brokerage account information.

Request data may be provided (302). Request data refers herein to information associated with a request for secure data entry, such as one or more input specifications and a proof of identity and/or data destination. An input specification refers herein to any specification of one or more data fields that may be input. An example of an input specification is a formatted list of one or more input field names, prompts, default values, selectable options and/or one or more restrictions on inputs such as minimum and/or maximum length, allowable characters, font(s), how to display characters during typing, and validation parameter(s) and/or script(s). Another example of an input specification is a specification for an input from a hardware authentication device, such as a time-varying key generator or a biometric device such as a fingerprint scanner. Another example of an input specification is a challenge, for example a challenge to provide a specified aspect of biometric information such as fingerprint information, or to prove possession of a cryptographic key, for example by encrypting provided text using the key. Another example of an input specification is a reference to stored information such as information related to the identity of the party of whom secure data is requested, such as a name, address, account name or password. In some embodiments, visual appearance of an input specification may be specified, for example using a document description language such as HTML or Postscript. An example of input specifications using a document description language is one or more data fields defined within an HTML <FORM> tag, for example a <FORM> tag with an argument that specifies secure data entry.

In some embodiments, an input specification or partial input specification may be associated with a pre-encryption specification. A pre-encryption specification refers herein to a specification of a way in which one or more fields may be secured prior to final encryption and/or transmission of data. An example of a pre-encryption specification is a cryptographic key, for example a public key, which may be used to separately encrypt one or more fields in an input specification. In some embodiments, such a cryptographic key may be included in or associated with a cryptographically signed certificate. In some embodiments, such a cryptographically signed certificate may include identity-related information, such as a name and/or logotype associated with an entity possessing a private key corresponding to a public key associated with the certificate. In some embodiments, information related to a pre-encryption specification, such as a certificate, may be associated by reference, for example by specifying a URL at which the pre-encryption information may be obtained. Another example of a pre-encryption specification is an indication that one or more input fields are to be hashed with a data destination.

A proof of identity refers herein to any way that an identity of a requestor of secure data can be established. An example of a proof of identity is a certificate that indicates an identity, which has been cryptographically signed by a trusted party. An example of a certificate is an X.509 certificate, details of which are available from the International Telecommunications Union and in IETF RFC 3280, section 4, which is available from the Internet Engineering Task Force. An example of a trusted party is a party on a list of trusted parties or who can demonstrate a link to a trusted party, for example by demonstrating that trust has been transitively conferred from a trusted root certification authority. In some embodiments, a system-wide trusted root certification authority may be used, which may for example specify a set of one or more authorities trusted to sign a certificate usable for secure data entry. In some embodiments, a private trusted root certification authority list or trusted certification authority list may be used, which may have fewer or different members than the system-wide trusted root certification authority list. In some embodiments, a certificate may include a destination address for securely entered data, such as a URL. In some embodiments, a certificate may be required to be of a particular type or category, such as a "high assurance" or "extended validation" certificate, in order to be considered a valid proof of identity.

In some embodiments, a certificate may include a cryptographic key, for example the public half of a public/private key pair. Such a key may, for example, be included as a "subject public key" in an X.509 certificate. In some embodiments, a certificate may include a displayable logotype or a reference to a displayable logotype, for example as discussed in IETF RFC 3709, available from the Internet Engineering Task Force. An RFC 3709 logotype may be included as a "subject organization logotype" as specified in section 4 of RFC 3709. In some embodiments, a certificate may include an audible name or a reference to an audible name, for example as described in RFC 3709. In some embodiments, a reference to external information such as a logotype of audible name may also include a characterization of the external information that may be used to ensure that the external information is valid, such as a one-way hash of the external information. In some embodiments, a certificate may include information related to the validity of data destination addresses, such as a valid data destination address or a pattern such as a regular expression against which a data destination address can be checked to determine its validity. In some embodiments, a certificate may include information related to the validity of requested input fields, for example by providing an enumeration of allowed field names and/or characteristics. In some embodiments, information associated with a certificate may be provided as proof of identity, for example information associated with a certificate used to initiate an encrypted and/or authenticated session such as an SSL/TLS connection associated with the request, such as an SSL/TLS connection over which a document containing the request was obtained. Another example of a proof of identity is a destination data address such as a URL, which may for example be used as a proof of identity in embodiments in which a reputation service is used, and/or data transmission is performed as described in conjunction with 308.

One example of providing request data is to pass it through an API to an application. An example of passing request data through an API to an application is for a component associated with a document browser to determine that a document contains an indicator that secure data entry is desired, and to make the request with request data associated with the document, for example by calling another component associated with the document browser. Another example of providing request data is to provide it to an operating system, for example via an operating system call. Another example of providing request data is to provide it to a system component such as a device driver or a registered system service.

The provided identity may be validated (303). An example of validating an identity is to verify that a cryptographic signature on a provided certificate is valid, and corresponds to a trusted party. In some embodiments, a demonstration of validity may be performed, such as challenging the party requesting secure data entry. An example of challenging the party requesting secure data entry is to provide text to the party, receive encrypted text back, decrypt the text using the public key associated with the certificate, and verify that the decrypted text is the same as the text that was sent. In some embodiments, challenging the party may include verifying a nonce identifier and/or channel-related information such as a source or destination IP address. In some embodiments, a demonstration of validity may be implicit, for example by using identity information associated with a certificate associated with a current SSL session, such as a certificate provided by a server such as document server 103 of FIG. 1 during an SSL/TLS handshake, which has previously been determined to be valid. Details of the SSL/TLS handshake are well known to those skilled in the art, and are for example described in section 7 of IETF RFC 2246, which is available from the Internet Engineering Task Force.

In some embodiments, validating an identity may include validating information associated with one or more input specifications. An example of validating information associated with one or more input specifications is to verify a cryptographic signature associated with the input specification(s), for example by verifying that it was created using a private key corresponding to a public key associated with the request data, such as a public key associated with a certificate.

In some embodiments, validated information associated with the input specification(s) may include other information associated with the request data, such as a certificate and/or data destination. In some embodiments, validated information associated with the input specification(s) may include only input specification(s), for example all of the input specification(s).

In some embodiments, information associated with request data, such as a certificate associated with a pre-encryption specification, may be retrieved, for example by accessing a specified URL to obtain the data.

In some embodiments, validating an identity may include checking a data destination address, such as a URL, and determining whether the data destination address is known to be legitimate, or is not known to be illegitimate. An example of validating a data destination address is to determine whether it is known by a reputation service, which may for example be queried over a network such as the internet. In some embodiments, a reputation service may provide other identity information, such as a logotype associated with the identity and/or a public cryptographic key associated with the entity. In some embodiments, a reputation service may be operated locally, or data associated with a reputation service may be cached locally. Another example of validating a data destination address is to determine whether it is permitted by a specification associated with a certificate or reputation service. In some embodiments, one or more input specifications may be validated, for example by determining whether they are permitted by a specification associated with a certificate or reputation service.

In some embodiments, software and/or hardware associated with data entry may be verified (309). Examples of verifying software associated with data entry include examining one or more device driver chains associated with input device(s) such as a keyboard and/or pointing device, and comparing them with a known baseline state, which may for example be performed using a hash or checksum, and verifying cryptographic signatures associated with one or more device drivers. An example of verifying hardware associated with data entry is to determine whether a driver associated with hardware is known, or is consistent with previously observed driver(s). Another example of verifying hardware associated with data entry it to verify a cryptographic operation performed by a cryptographically enabled input device, for example using a challenge/response protocol. If it is determined that there is evidence that hardware has been inserted and/or modified, a user interface element may be displayed, and/or input may not be allowed.

A validated identity and one or more input fields corresponding to the provided input specification(s) may be presented in a spoof-resistant manner (304). One example of a spoof-resistant manner is to receive a secure attention sequence (SAS) and present a user interface element such as a window, or permit input in a previously displayed input area, in response. Another example of a spoof-resistant manner is to present the input field(s) in a reserved area on a display such as a screen, for example an area that is used only for secure data entry. Another example of a spoof-resistant manner is to activate an indicator that secure data entry is being performed, such as a light or alphanumeric display on a keyboard or computer. Another example of a spoof-resistant manner is to present a special user interface element such as a window, with a visual characteristic such as a particular border color that applications are not permitted to mimic. Another example of a spoof-resistant manner is to use an external secure data entry device such as external secure data entry device 104 of FIG. 1. Another example of a spoof-resistant manner is any scheme used by a Trusted Computing system to provide visual indication of trusted code. Examples of Trusted Computing systems include systems conforming to the various TCG specifications, such as the TCG Architecture Overview, published by the Trusted Computing Group. In some embodiments, presenting in a spoof-resistant manner may include preventing applications from modifying or overlapping displayed information.

In some embodiments, data subject to pre-encryption may be indicated. One example of indicating data subject to pre-encryption is to display identity-related information, such as a name and/or logotype associated with a certificate, that is related to pre-encryption to be performed on one or more data fields. An example of a certificate that is related to pre-encryption is a certificate associated with an encryption key that is to be used for pre-encryption. Another example of indicating data subject to pre-encryption is to visually indicate data that is subject to hashing, which may in various embodiments be indicated with or without an indication of the destination of such data.

In some embodiments, a personalized trusted path indicator may be displayed. A personalized trusted path indicator refers herein to a distinctive indication, such as a visual or auditory indication, associated with a trusted path input window or area. An example of a personalized trusted path indicator is a locally stored image, which may in this example be selected by a user, and/or randomly determined at the time an application and/or operating system associated with trusted path input is installed and/or configured.

Field data corresponding to the input fields may be received (305). An example of receiving field data is to receive one or more inputs from the user, with an indication that the user has completed data entry.

In some embodiments, a data recipient may be validated (306). Validating a data recipient refers herein to receiving a user confirmation that the data recipient is the intended recipient. One example of validating a data recipient is to receive an input such as a keyboard input and verify that the input is substantially similar to some or all information associated with the data recipient, such as a full or partial domain name or entity name associated with the data recipient. Another example of validating a data recipient is to display a list of identities of possible data recipients, for example in a user interface element such as a pulldown menu, a displayed plurality of possible data recipients, or any other type of display incorporating more than one possible data recipient, of which one is associated with the actual data recipient associated with the trusted path input, and to receive an input that either matches the data recipient (in which case the data recipient is considered to have been validated) or does not match the data recipient (in which case the data recipient is not considered to have been validated). Further examples and details of validating a data recipient are discussed in conjunction with FIG. 4.

In some embodiments, if the data recipient is not validated, additional information may be presented. For example, a user may be given an opportunity to report a phishing attempt, to amend his or her choice and re-select the data recipient, and/or to cancel the data input without transmitting data.

Figure 10:
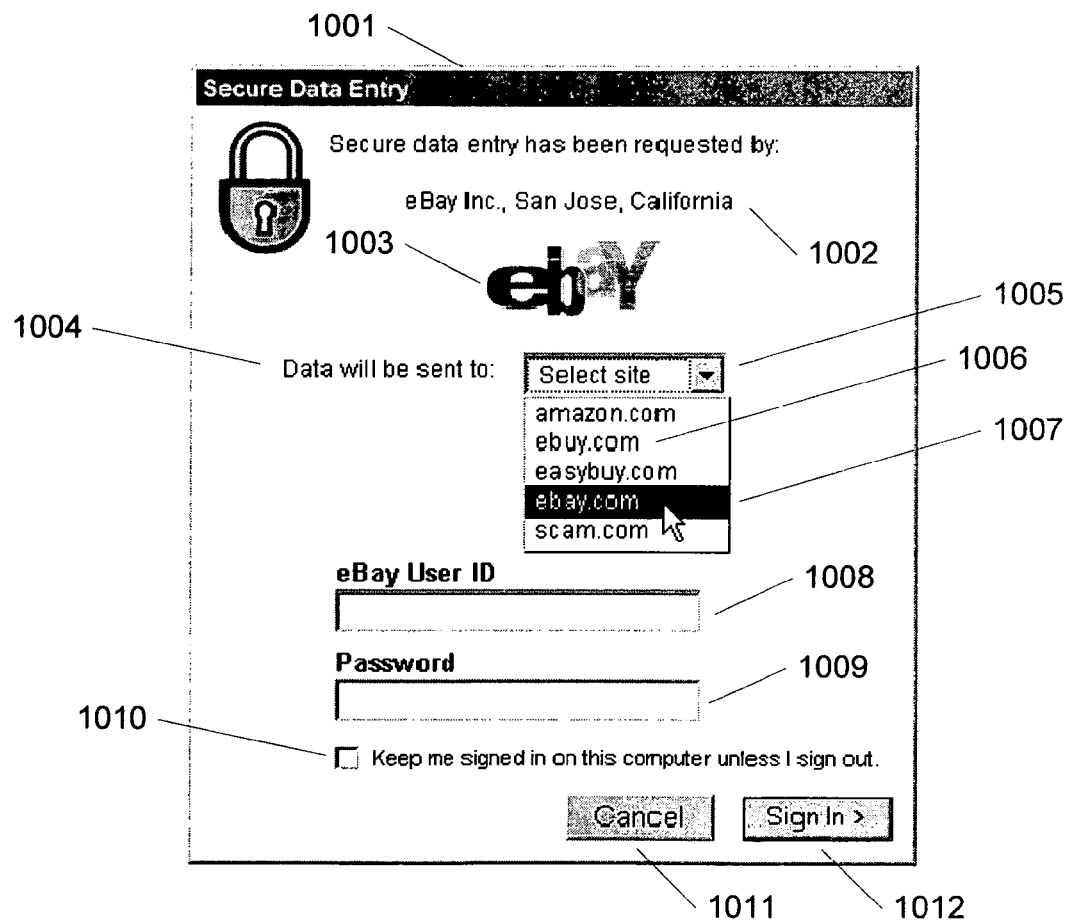
FIG. 10 is an illustrative example of a user interface element for receiving secure data with data recipient validation, according to some embodiments.

An example of a user interface for validating a data recipient is further illustrated in conjunction with FIG. 10.

Field data may be processed (307). An example of processing field data is to pre-encrypt data associated with one or more fields. An example of pre-encrypting data is to encode data in accordance with a pre-encryption specification, for example by encrypting the data using a key associated with the pre-encryption specification or to hash the data with a data destination or other salt associated with the pre-encryption specification. In some embodiments, prior to pre-encrypting data, two or more data fields may be combined together, in a manner that may be specified in connection with a pre-encryption specification. For example, a user-input field such as a credit card number may be combined with a predetermined field such as a field associated with a policy statement, and the combined fields may be pre-encrypted with a specified cryptographic key, which may for example be associated with a third-party entity such as a payment processor. As an example of such an embodiment, a web page for Example, Inc. may securely request a credit card number and specify a private key associated with a credit card processor for Example, Inc. in conjunction with the credit card input field(s). A policy statement may be provided, for example in an invisible field, stipulating that charges to the card are to be permitted only when initiated by Example, Inc. These fields may be combined together and encrypted using the specified payment processor's public key.

Field data may be secured (308). One example of securing field data is to encrypt the field data, for example using a public key associated with the identity. One example of a public key associated with the identity is a public key associated with a certificate. Another example of a public key associated with the identity is a public key obtained from a reputation service. Another example of a public key associated with the identity is a public key associated with a destination address or other characteristic of the identity via identity-based encryption. Identity-based encryption techniques are well known to those skilled in the art, and may for example be found in Boneh and Franklin, "Identity Based Encryption from the Weil Pairing," SIAM J. of Computing, Vol. 32, No. 3, pp. 586-615, 2003.

Another example of securing field data is to hash the field data, for example by hashing a credential field such as a password field together with a characteristic of the destination address, such as a domain name associated with the destination address. An example of such a password hashing operation is provided in Blake Ross, Nick Miyake, Robert Ledesma, Dan Boneh and John Mitchell, "A 'Simple' Solution to the Unique Password Problem," presented at the 2004 Annual Stanford Affiliates' Meeting and available from Stanford University. Encrypted field data may be provided to an entity such as the entity that requested secure data entry. Another example of securing field data is to perform password-authenticated key agreement. Examples of password-authenticated key agreement are discussed in conjunction with 503 of FIG. 5. In some embodiments, password-authenticated key agreement may be combined with credential hashing, for example as discussed in conjunction with FIG. 5. Another example of securing field data is to transmit the field data to the data destination address. In some embodiments, after encrypting or transmitting field data, unencrypted field data may be overwritten in memory, for example by setting memory associated with unencrypted field data to a predetermined value such as zero.

Figure 4:
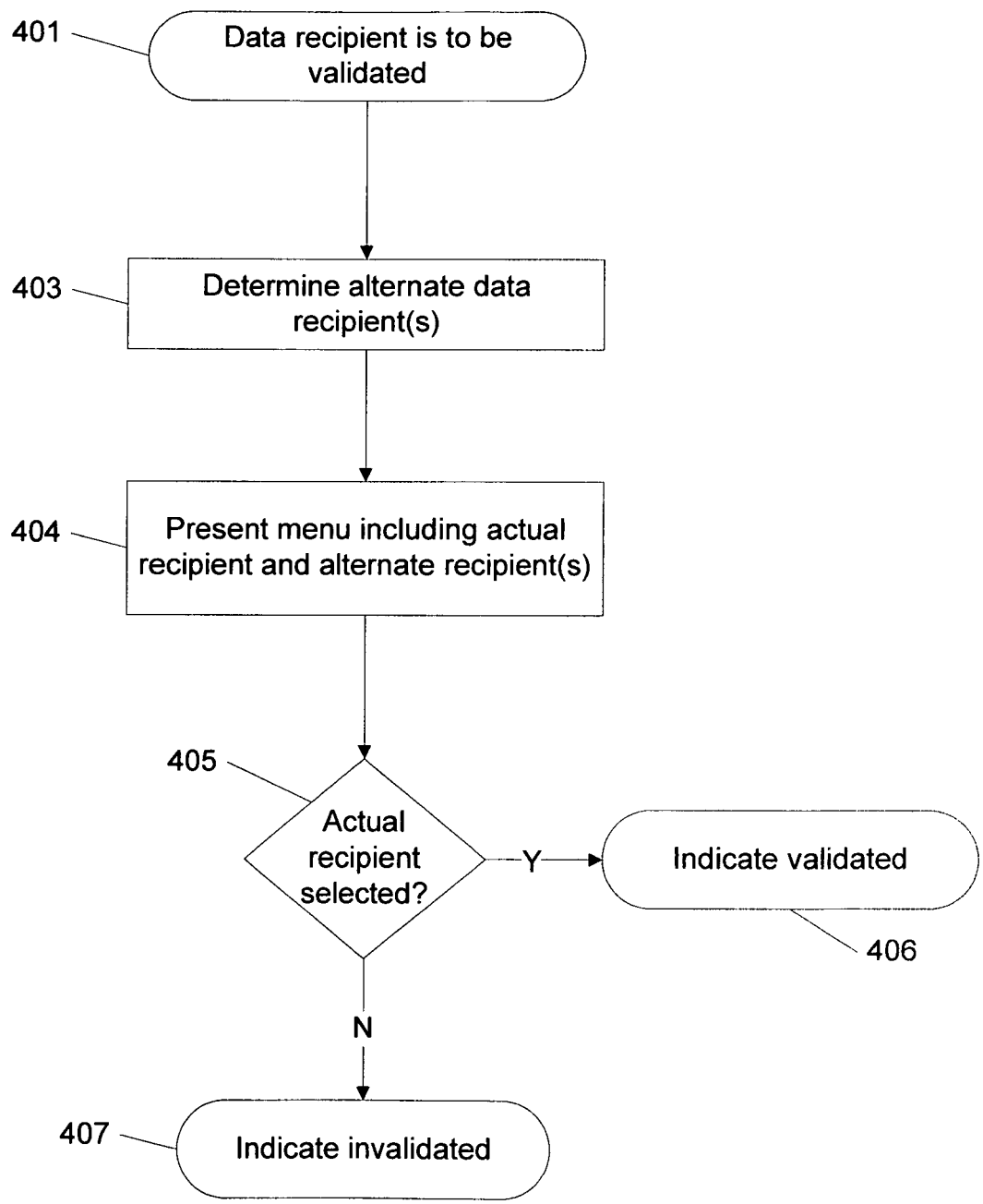
FIG. 4 is a flow diagram of a method for validating a data recipient, according to some embodiments.

FIG. 4 is a flow diagram of a method for validating a data recipient, according to some embodiments. In this example, a data recipient is to be validated (401), for example as discussed in conjunction with 306 of FIG. 3 or 707 of FIG. 7.

One or more alternate data recipients may be determined (403). An alternate data recipient refers herein to a data recipient other than the data recipient being validated, for example a data recipient that is believed to be legitimate. In various embodiments, an alternate data recipient may be predetermined, or may be associated with a recipient to which a user has previously provided data securely.

In some embodiments, an alternate data recipient may be selected from among predetermined and/or previously encountered data recipients based on closeness to metadata such as a name, domain, and/or URL associated with the actual data recipient, for example by selecting an alternate data recipient with associated metadata that is textually close to metadata associated with the actual data recipient. Examples of determining textual closeness between two data elements include determining that one data element is a substring of another, determining that two data elements have a relatively long common substring, prefix or suffix, matching including transformations such as removing prefixes and/or semantically unimportant characters such as hyphens and/or underlines, disregarding top-level domains, subdomains, directories and/or arguments, determining that two data elements have a relatively small edit distance, and/or other ways to perform approximate text matching known to those skilled in the art. Another example of selecting an alternate data recipient is to select a known data recipient (for example, a data recipient known from a predetermined list and/or a previously encountered data recipient) associated with a logotype that is visually close to a logotype associated with the actual data recipient. Examples of determining visual closeness of logotypes include feature extraction and comparison, approximate hashing, and other ways to determine visual closeness known to those skilled in the art.

A data recipient menu including the actual data recipient and one or more alternate data recipients may be presented (404). Examples of a menu include a pulldown menu such as the pulldown menu illustrated in FIG. 10, and an enumeration of selectable choices such as menu items associated with radio buttons. In some embodiments, a single alternate data recipient may be included in the menu. In some embodiments, multiple alternate data recipients may be included in the menu, for example all within a predetermined closeness metric to the actual data recipient, or the N alternate data recipients closest to the actual data recipient, such as two, three, four, or five. In some embodiments, the candidates may be randomly ordered. In some embodiments, the candidates may be canonically ordered, for example alphabetically or by recentness and/or frequency of use. Displaying a candidate in this context may include displaying a name and/or logotype, for example a name and/or logotype associated with a cryptographic certificate associated with the data recipient. Examples of a name include an entity name, a full or partial domain name, and a full or partial URL. A user may be allowed to select an intended recipient from among the actual recipient and one or more alternate recipients.

It may be determined whether the actual data recipient been selected (405). If it is determined that the actual data recipient has been selected (405), then in this example the data recipient is considered validated (406). An example of considering the data recipient validated is to return a code to a caller indicating that the validation occurred. If it is determined that the user has selected an alternate recipient (405), then in this example the recipient is not considered validated (407). An example of considering the data recipient not validated is to return a code to a caller indicating that the validation did not occur. A caller receiving such a code may elect to terminate or otherwise interfere with data entry. Another example of considering the data recipient not to be validated is to present a user interface element indicating that a validation has not occurred, including one or more options which may include re-selecting an intended data recipient and/or cancelling data entry. In some embodiments, validation may be associated with permitting data entry, and a lack of validation may be associated with cancelling data entry.

An example of a user interface for validating a data recipient is further illustrated in conjunction with FIG. 10.

Figure 5:
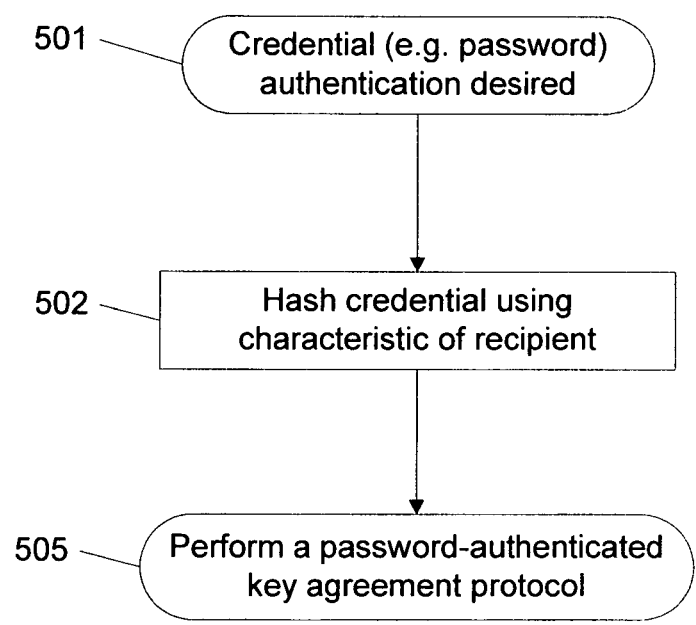
FIG. 5 is a flow diagram of a method for combining credential hashing with password-authenticated key agreement, according to some embodiments.

FIG. 5 is a flow diagram of a method for combining credential hashing with password-authenticated key agreement, according to some embodiments. In this example, authentication of a shared credential is desired (501). In some embodiments, credential authentication may be desired in conjunction with a trusted path operation, for example as discussed in conjunction with 308 of FIG. 3. In some embodiments, credential authentication may be desired independent of trusted path, for example as part of a user authentication on a web site for login, access or transactional verification purposes. In the context of this FIG. 5, a shared credential refers to a shared secret that is known to both parties performing authentication. One example of a shared credential is a password. Another example of a shared credential is a one-time passcode such as a time-variant passcode or a passcode that changes in a sequence known to both parties performing authentication.

A shared credential may be hashed with a characteristic of the recipient (501). An example of a characteristic of the recipient is a domain name associated with the recipient. An example of such a credential hashing operation with reference to passwords is provided in Blake Ross, Nick Miyake, Robert Ledesma, Dan Boneh and John Mitchell, "A 'Simple' Solution to the Unique Password Problem," presented at the 2004 Annual Stanford Affiliates' Meeting and available from Stanford University.

A password-authenticated key agreement protocol may be performed using the hashed password (503). A password-authenticated key agreement protocol refers herein to any operation that authenticates a shared credential without transmitting the credential. In some embodiments, such authentication may be mutual. Such authentication may, for example, include a key exchange based on hashed credential data. Examples of password-authenticated key agreement protocols are discussed in:

a. David Jablon, "Strong Password-Only Authenticated Key Exchange." Computer Communication Review, ACM SIGCOMM, vol. 26, no. 5, pp. 5-26, October 1996. (Web version revised Mar. 2, 1997).
b. Thomas Wu, "The Secure Remote Password Protocol." Available via the internet from Stanford University.
c. Philip MacKenzie and Ram Swaminathan, "Secure Network Authentication with Password Identification." Available via the internet from the IEEE.
d. Mihir Bellare and Phillip Rogaway, "The AuthA Protocol for Password-Based Authenticated Key Exchange." Available via the internet from the IEEE.
e. Jonathan Katz, Rafail Ostrovsky & Moti Yung, "Efficient Password-Authenticated Key Exchange Using Human-Memorable Passwords." Published in LNCS 2045: Topics in Cryptology—Eurocrypt 2001 Proceedings, p. 475 ff., 2001, Springer-Verlag.
f. Taekyoung Kwon, "Ultimate Solution to Authentication via Memorable Password." Available via the internet from the IEEE.
g. David Jablon, "Extended Password Key Exchange Protocols Immune to Dictionary Attacks." Proceedings of the Sixth Workshops on Enabling Technologies: Infrastructure for Collaborative Enterprises (WET-ICE '97), IEEE Computer Society, Jun. 18-20, 1997, Cambridge, Mass., pp. 248-255.
h. Yongge Wang, "EC-SRP." Available via the internet from the IEEE.
i. Warwick Ford & Burt Kaliski, "Server-Assisted Generation of a Strong Secret from a Password." Proceedings of the IEEE 9th International Workshops on Enabling Technologies: Infrastructure for Collaborative Enterprises, NIST, Gaithersburg Md., Jun. 14-16, 2000.

j. David Jablon, "Password Authentication Using Multiple Servers." LNCS 2020: Topics in Cryptology—CT-RSA 2001, Apr. 8-12, 2001 Proceedings, pp. 344-360, 2001, Springer-Verlag.
k. David Jablon, "SRP-4." Available via the internet from the IEEE.
l. Philip MacKenzie, "The PAK suite: Protocols for Password-Authenticated Key Exchange." Available via the internet from the IEEE.
m. Philip MacKenzie, "Submission Update to PAK Schemes." Available via the internet from the IEEE.
n. Thomas Wu, "SRP-6: Improvements and Refinements to the Secure Remote Password Protocol." Available via the internet from the IEEE.
o. Taekyoung Kwon, "Authentication via Memorable Passwords —Revised Submission to IEEE P1363.2." Available via the internet from the IEEE.
p. Taekyoung Kwon, "Summary of AMP (Authentication and key agreement via Memorable Passwords." Available via the internet from the IEEE.
q. Taekyoung Kwon, "Addendum to Summary of AMP." Available via the internet from the IEEE.
r. Taekyoung Kwon, "Revision of AMP in IEEE P1363.2 and ISO/IEC 11770-4." Available via the internet from the IEEE.

Figure 6:
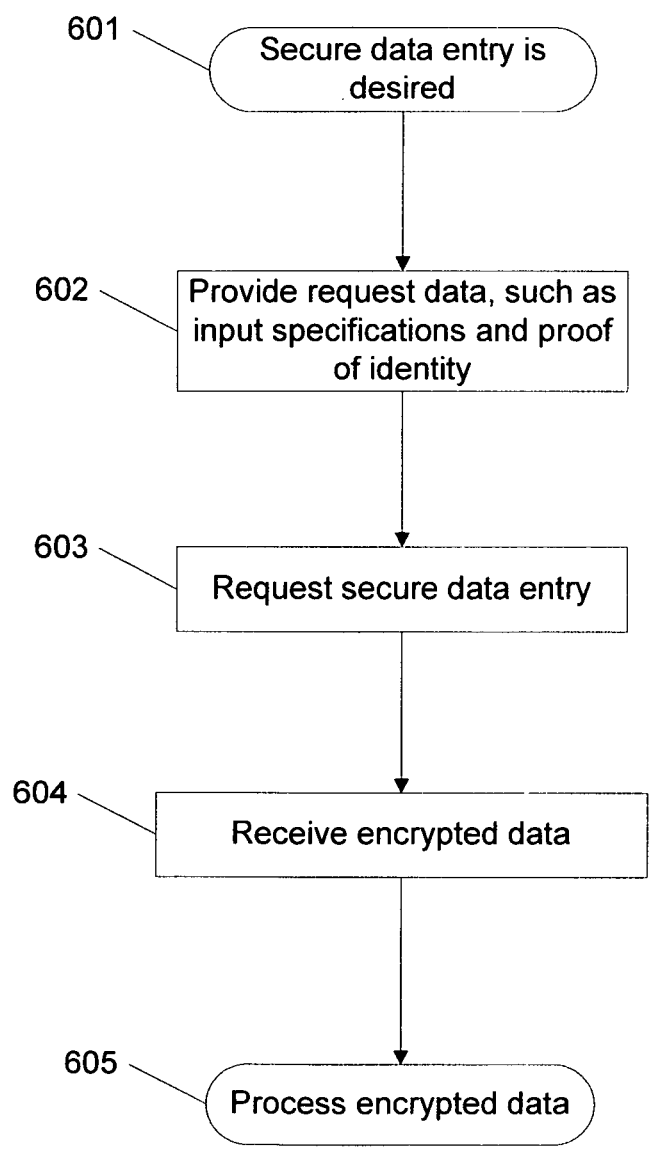
FIG. 6 is a flow diagram of a method for requesting and receiving secure data entry, according to some embodiments.

FIG. 6 is a flow diagram of a method for requesting and receiving secure data entry, according to some embodiments. In this example, secure data entry is desired (601). Examples of contexts in which secure data entry may be desired are discussed in conjunction with 301 of FIG. 3.

Request data may be provided (602). Request data refers herein to information associated with a request for secure data entry, such as one or more input specifications and a proof of identity and/or optional data destination, for example as discussed in conjunction with 302 of FIG. 3. In this example, providing request data may include gathering data and preparing it for a programmatic call, for example by filling a predetermined data structure with the request data.

Secure data entry may be requested (603). One example of requesting secure data entry is to make an operating system call. Another example of requesting secure data entry is to make a call into an application programming interface (API) associated with an application program such as a document browser. Another example of requesting secure data entry is to call a system component such as a device driver component, registered system service, or any other component accessible through a programmatic interface. A request for secure data entry service may include request data. In some embodiments, a request may be received as described in conjunction with 701 of FIG. 7 or 1201 of FIG. 12. Request data may include a cryptographic key. In some embodiments, a cryptographic key may include the public half of a public/private key pair, for example a public key associated with a cryptographically signed certificate. In some embodiments, a cryptographic key may include a key used for a keyed cryptographic hash, for example a domain name associated with a data destination. In some embodiments, request data may include a callback function or a reference to a callback function.

Encrypted data may be received (604). An example of receiving encrypted data is to receive the data in response to a request for secure data entry, such as the request described in conjunction with 603. Examples of returning data associated with a request for secure data entry are discussed in conjunction with 709 of FIGS. 7 and 1207 of FIG. 12. An example of receiving data in response to a request is to receive the data, or a reference to the data, as a return value to a call. Another example of receiving data in response to a request is to receive the data in a predetermined location, or a specified location in an event that is passed to the requestor. Another example of receiving data in response to a request is to receive the data, or a reference to the data, in an argument to a callback function provided with the request. Another example of receiving data in response to a request is to initiate a call to retrieve the data. Encrypted data may be associated with data entered by a user, for example such data encrypted using a public key or used in a keyed hash.

Encrypted data may be processed (605). One example of processing encrypted data is to transmit the encrypted data to a data destination. Another example of processing encrypted data is to store the encrypted data. Another example of processing encrypted data is to decrypt the encrypted data.

Figure 7:
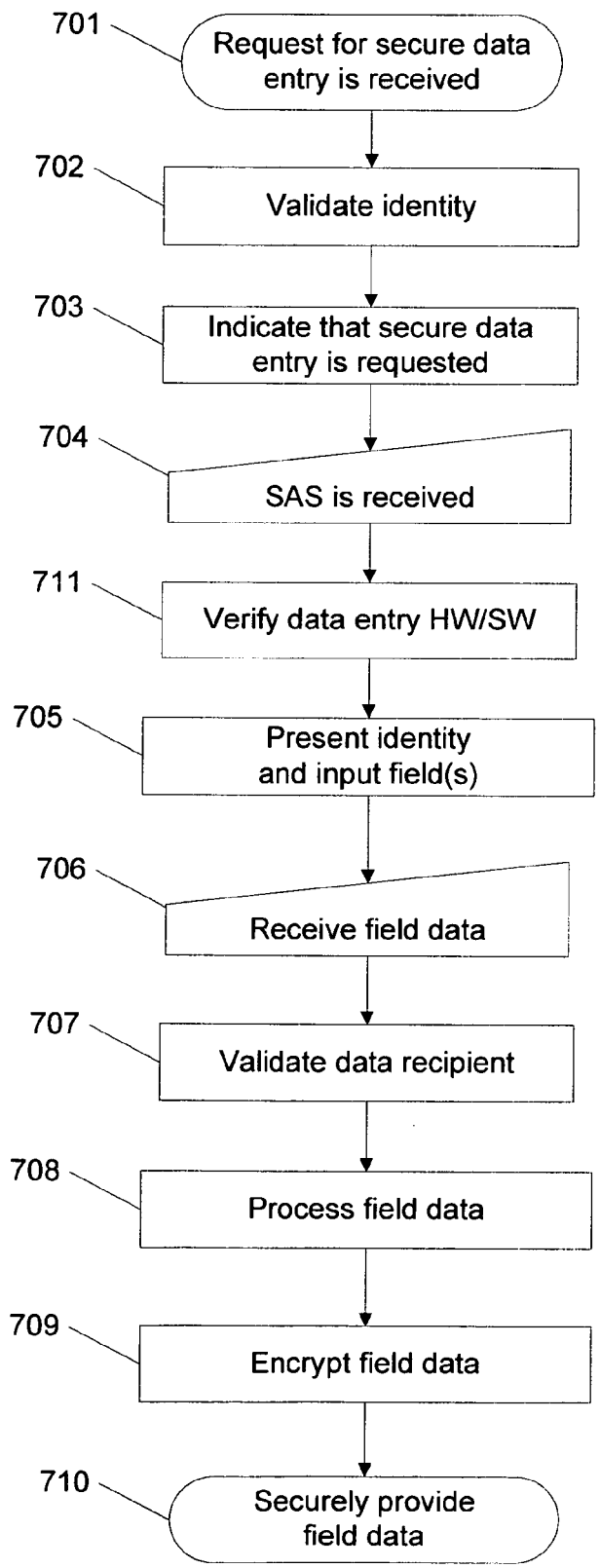
FIG. 7 is a flow diagram of a method for processing a request for secure data entry using a secure attention sequence, according to some embodiments.

FIG. 7 is a flow diagram of a method for processing a request for secure data entry using a secure attention sequence, according to some embodiments. In this example, a request for secure data entry is received (701). Examples of receiving a request for secure data entry include handling an operating system call, handling a call to a system service and handling a call to an application program through an API. In some embodiments, a request may have been made as described in conjunction with 603 of FIG. 6. A request may include request data such as information, and/or one or more references to information, relating to identity and to one or more input fields. Examples of input fields and identity-related information such as data destinations, certificate-based proofs of identity and pre-encryption specifications are discussed in conjunction with 302 of FIG. 3.

Request data, and optionally caller characteristic data, may be stored, for example in a secure data parameter area. A secure data parameter area refers herein to any memory, including RAM, virtual memory, flash memory, magnetic memory or optical memory, that may be used to store request data. In some embodiments, there may be a single secure data parameter area. In some embodiments, there may be more than one secure data parameter area, for example a predetermined number or one per active request for secure data entry. An example of caller characteristic data is a characteristic of the computer program making the request, such as a process identifier.

A provided identity and/or other request data may be validated (702). Examples of validating request data, including an identity, are discussed in conjunction with 303 of FIG. 3.

Figure 8:
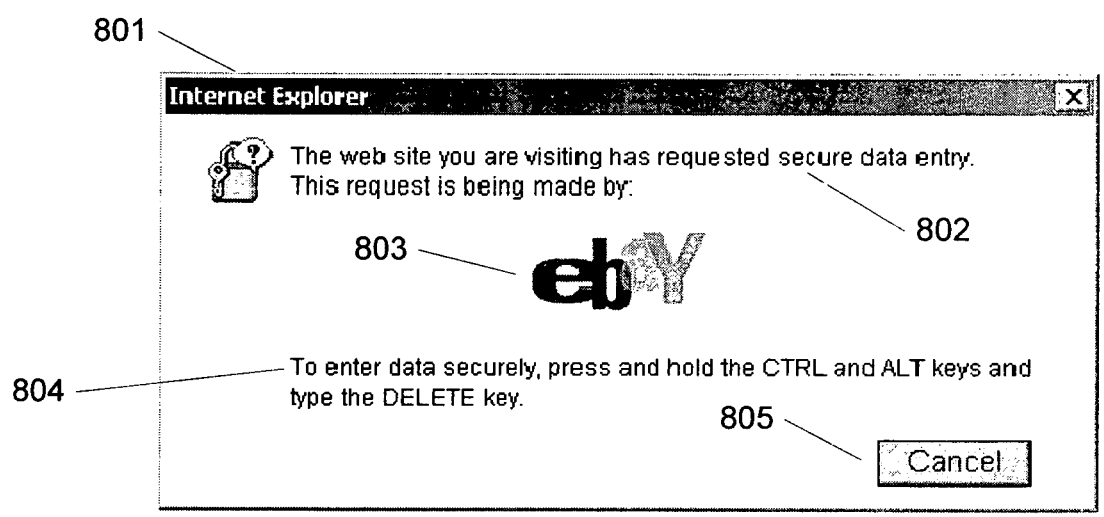
FIG. 8 is an illustrative example of a user interface element for indicating that secure data entry has been requested, according to some embodiments.

In some embodiments, an indication may be provided that secure data entry has been requested (703). An example of an indication that secure data entry has been requested is a user interface element such as a window. An example of a window providing an indication that secure data entry has been requested is illustrated in FIG. 8. In some embodiments, a user interface element may include informational text indicating that data entry has been requested, identity-related information such as a requestor name and/or logotype, and/or instructional text informing the user how to provide a secure access sequence (SAS).

Another example of an indication that secure data entry has been requested is a static user interface element associated with secure data fields embedded in a document such as an HTML document. In some embodiments, such a static user interface element may include an indication of one or more fields that require secure data entry, such as a border and/or indicative coloration associated with such field(s). In some embodiments, such a static user interface element may include informational text indicating that data entry has been requested, and/or instructional text informing the user how to provide a secure access sequence (SAS). An example of such a static user interface element is discussed in conjunction with FIG. 11.

A secure access sequence (SAS) may be received (704). Examples of a SAS are discussed in conjunction with SAS interceptor 209 of FIG. 2. In some embodiments, a SAS may be received by a device driver such as a keyboard driver. In some embodiments, a SAS may be received by an operating system component or installed component such as a Windows GINA or a Linux SAK handler. In some embodiments, a SAS may be received by an application program, for example by an event handler.

In some embodiments, it may be determined whether a request for secure data entry was previously received, for example as described in conjunction with 701. Such a determination may, for example, be made on the basis of the presence of data related to a request for secure data entry in a secure data parameter area. If it is determined that a request was received, then in this example data may be retrieved from the secure data parameter area. If it is determined that no request was made, then in this example the SAS may be handled normally, for example by passing it through to another handler, by taking no action, or by presenting a system menu such as a shutdown/logout menu and/or a task manager.

In some embodiments, software and/or hardware associated with data entry may be verified (711), for example as discussed in conjunction with 309 of FIG. 3.

Information related to the identity of the requestor and/or data recipient, and one or more input fields, may be presented (705). Such information may be associated with the request data, as discussed in conjunction with 701. In some embodiments, software and/or hardware associated with data entry may be verified, for example as discussed in conjunction with 305 of FIG. 3. An example of presenting identity-related information and input fields is to present a user interface element containing such information, for example a window such as the window illustrated in FIG. 9. In some embodiments, presenting the identity-related information and input fields may include rendering a specification of its visual appearance, for example using HTML. In some embodiments, presenting the identity-related information and input fields may include constructing an element that allows a user to determine whether to authorize the release of stored identity-related information, such as a name, address, account name or password. In some embodiments, when such a user interface element is presented, programs may be prevented from modifying the computer display, for example by rejecting or queuing requests to modify the display, or by suspending or terminating one or more processes. In some embodiments, scripts associated with a description of input fields, such as Javascript scripts in an HTML form description, may be prevented from modifying the visual appearance, for example by not allowing them to run, or by disallowing changes to the document object model (DOM).

Figure 11:
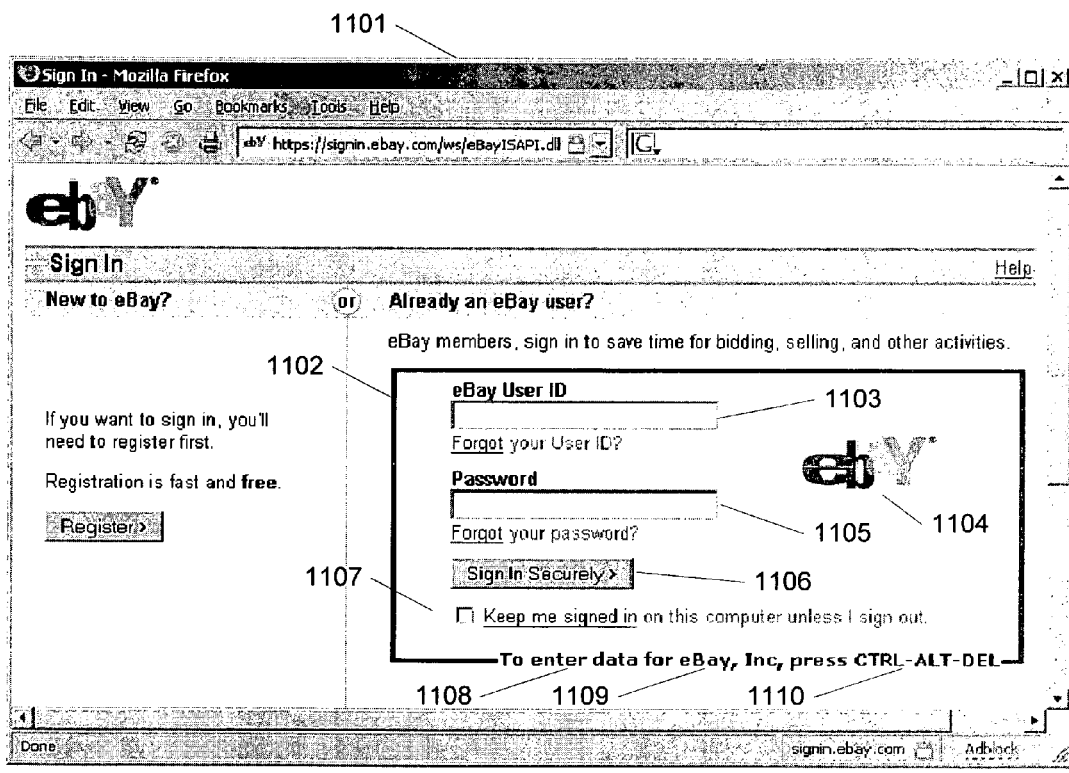
FIG. 11 is an illustrative example of a user interface element for requesting and receiving secure data, according to some embodiments.

Another example of presenting identity-related information and input fields is to permit data entry in an area of the screen that includes one or more embedded secure data entry fields, and optionally changing focus to such a field, for example the first listed field, when a SAS is received. In such embodiments, identity-related information such as a name and/or logo may be displayed, or may be omitted, or may previously have been displayed, for example as described in conjunction with 703. In some embodiments, such an embedded area may be rendered prior to receiving a SAS, for example when the rest of the document is rendered, and completely or partially re-rendered when a SAS is received, for example with content substantially identical to the initially presented content. In some embodiments, such an embedded area may initially be unrendered, or rendered with content indicating that a SAS is required to see the content that is requested, and may be re-rendered with input field(s) when a SAS is received. In some embodiments, scripts may be prevented from modifying and/or obscuring the embedded content both before and after the SAS is received. An example of an embedded user interface, showing an example in which embedded content is rendered prior to receiving a SAS, is illustrated in FIG. 11.

In some embodiments, data subject to pre-encryption may be indicated. Examples of indicating data subject to pre-encryption are discussed in conjunction with 304 of FIG. 3.

In some embodiments, a personalized trusted path indicator may be displayed. Examples of a personalized trusted path indicator are discussed in conjunction with 304 of FIG. 3.

An opportunity for data entry may be provided, for example by allowing a user to enter, select and/or manipulate data with one or more input devices such as a keyboard and/or a pointing device such as a mouse. Field data may be received (706), for example when it is indicated that data entry is complete. An example of indicating that data entry is complete is when a user interface element that terminates input is selected, such as a button labeled "Done" or "Next," or a selector that has been explicitly or implicitly designated as providing a final input. In some embodiments, field data may be received from an external device, such as a hardware authentication device that may, for example, automatically provide an identifier. Examples of hardware authentication devices include time-variant code generators and biometric devices such as fingerprint scanners. In some embodiments, a field input may be provided in the form of a response to a challenge that was posed in the request data. An example of a response to a challenge is a characterization of biometric information such as fingerprint information that corresponds to the challenge. Another example of a response to a challenge is to encrypt text associated with the challenge using a cryptographic key.

In some embodiments, a data recipient may be validated (707). Examples of validating a data recipient are discussed in conjunction with 306 of FIG. 3 and FIG. 4.

Field data may be processed (708). An example of processing field data is to pre-encrypt data associated with one or more fields. An example of pre-encrypting data is to encode data in accordance with a pre-encryption specification, for example by encrypting the data using a key associated with the pre-encryption specification or to hash the data with a data destination or other salt associated with the pre-encryption specification. In some embodiments, prior to pre-encrypting data, two or more data fields may be combined together, in a manner that may be specified in connection with a pre-encryption specification. For example, a user-input field such as a credit card number may be combined with a predetermined field such as a field associated with a policy statement, and the combined fields may be pre-encrypted with a specified cryptographic key, which may for example be associated with a third-party entity such as a payment processor. As an example of such an embodiment, a web page for Example, Inc. may securely request a credit card number and specify a private key associated with a credit card processor for Example, Inc. in conjunction with the credit card input field(s). A policy statement may be provided, for example in an invisible field, stipulating that charges to the card are to be permitted only when initiated by Example, Inc. These fields may be combined together and encrypted using the specified payment processor public key.

Field data may be encrypted (709). An example of encrypting field data is to encrypt it using a public key, for example a public key provided in a cryptographically signed certificate or from a reputation service, for example as discussed in conjunction with 701. One example of encrypting data using a public key is to directly encrypt the data using a public-key encryption algorithm such as RSA. Such algorithms are widely known to those skilled in the art. Another example of encrypting data using a public key is to generate a key for a symmetric cipher, for example randomly, encrypt that key using a public-key encryption algorithm such as RSA, encrypt the field data using a symmetric cipher with the symmetric key, and associate the encrypted symmetric key with the encrypted field data. Symmetric ciphers, such as AES, DES, IDEA and Triple-DES, as well as the use of stream ciphers such as RC4 as symmetric ciphers, are well known to those skilled in the art.

Field data may be securely provided (710). In some embodiments, field data may be provided in encrypted form, for example after encrypting as described in conjunction with 709. An example of providing encrypted field data is to return it to the requestor who requested secure data entry as described in conjunction with 701. One example of returning the data is to place it in a secure data parameter area (which may be the same as or different than the secure data parameter area discussed in conjunction with 701 and 704), and optionally signal the requestor that the data is available, for example by passing an event or signal to the requestor. In some embodiments, caller characteristic information such as that discussed in conjunction with 701 may be associated with the secure data parameter area. In some embodiments, the secure data parameter area may be readable to the caller. In some embodiments, information associated with the secure data parameter area may be made available via handling a second call and returning a result. In some embodiments, a characteristic of a caller, such as a process identifier, may be verified prior to providing data associated with the secure data parameter area, for example by determining whether the process identifier of the caller matches a process identifier associated with the secure data parameter area. Another example of returning the data is to provide a return value associated with the data, for example including the data or a reference to the data. Another example of returning the data is to provide an argument associated with the data, for example including the data or a reference to the data, to a callback function that was provided by the requestor in 701.

In some embodiments, securely providing field data may include transmitting field data to a data destination, for example a data destination described in conjunction with 702. In such embodiments, transmitted data may optionally be encrypted, for example as described in conjunction with 709 or by transmitting the field data using SSL/TLS.

FIG. 8 is an illustrative example of a user interface element for indicating that secure data entry has been requested, according to some embodiments. Such a user interface element may, for example, be displayed as described in conjunction with 703 of FIG. 7. In this example, a window 801 includes information relating to secure data entry. The window 801 may include an informational notice 802 that informs the user that secure data entry has been requested. The window 801 may also include identity-related information 803, in this example an eBay logotype. In some embodiments, a name associated with the requestor may be displayed. Such identity-related information may, for example, be associated with a cryptographically signed certificate, or a reputation service. The window 801 may also include an instructional notice 804 informing the user how to provide a secure attention sequence (SAS). An option to cancel secure data entry 805 is also provided in this example.

Figure 9:
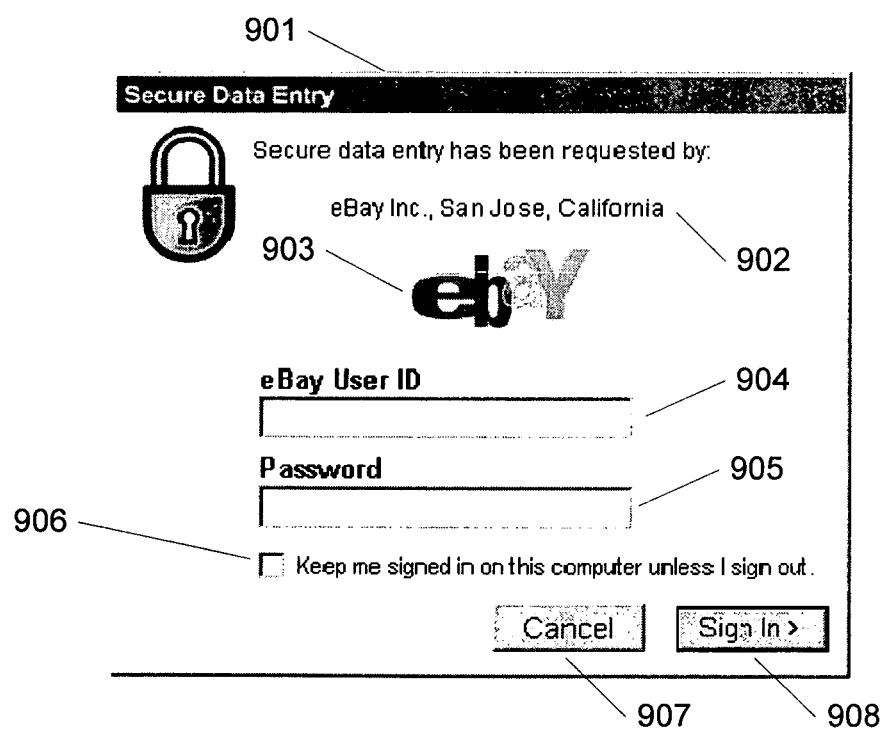
FIG. 9 is an illustrative example of a user interface element for receiving secure data, according to some embodiments.

FIG. 9 is an illustrative example of a user interface element for receiving secure data, according to some embodiments. Such a user interface element may, for example, be displayed as described in conjunction with 705 of FIG. 7. In this example, a window 901 includes information and input fields associated with secure data entry. The window 901 may include an identification of the secure data requestor 902, which may for example be associated with a cryptographically signed certificate or a reputation authority. The window 901 may include a logotype associated with the secure data requestor 903, which may for example be associated with a cryptographically signed certificate or a reputation authority. In some embodiments, an auditory identification of the secure data requestor may be presented. Input fields 904, 905, 906 correspond to data requested for secure entry. In this example, the fields are labeled "eBay User ID" 904, "Password" 905 and "Keep me signed in on this computer unless I sign out" 906, and are associated with a text input field, a password input field with a masked input, and a checkbox input respectively. In this example, buttons labeled "Cancel" 907 and "Sign In >" 908 are shown. In this example, the "Cancel" button may cancel the secure data entry, and the "Sign In >" button may terminate input and pass the input to the next stage of processing, such as processing and/or encryption, for example as described in conjunction with 708 and 709 of FIG. 7, or 1205 and 1206 of FIG. 12, respectively. In some embodiments, such buttons, or buttons similar to them, may be a standard element. In some embodiments, such buttons may have configurable characteristics such as a label.

FIG. 10 is an illustrative example of a user interface element for receiving secure data with data recipient validation, according to some embodiments. Such a user interface element may, for example, be displayed as described in conjunction with 304 of FIG. 3 or 705 of FIG. 7. In this example, a window 1001 includes information and one or more input fields associated with secure data entry. The window 1001 may include an identification of the secure data requestor 1002, which may in various embodiments be associated with a cryptographically signed certificate or a reputation authority. The window 1001 may include a logotype associated with the secure data requestor 1003, which may in various embodiments be associated with a cryptographically signed certificate or a reputation authority. In some embodiments, an auditory identification of the secure data requestor may be presented.

A user interface for validating a data recipient may be presented, for example as discussed in conjunction with 707 of FIGS. 7 and 306 of FIG. 3. In the example of this FIG. 10, a prompt to validate a data recipient 1004 may be presented, and/or user interface element such as a combo box 1005 may allow selection of a data recipient from among two or more potential data recipients, which may for example include the data recipient requesting data 1007, and one or more spurious data recipients such as spurious data recipient 1006.

Input fields 1008, 1009, 1010 correspond to data requested for secure entry. In this example, the fields are labeled "eBay User ID" 1008, "Password" 1009 and "Keep me signed in on this computer unless I sign out" 1010, and are associated with a text input field, a password input field with a masked input, and a checkbox input respectively. In this example, buttons labeled "Cancel" 1011 and "Sign In >" 1012 are shown. In this example, the "Cancel" button may cancel the secure data entry, and the "Sign In >" button may terminate input and pass the input to the next stage of processing, such as processing and/or encryption, for example as described in conjunction with 708 and 709 of FIG. 7, or 1205 and 1206 of FIG. 12, respectively. In some embodiments, such buttons, or buttons similar to them, may be standardized, such as a "submit" button. In some embodiments, such buttons may have configurable characteristics such as a label.

FIG. 11 is an illustrative example of a user interface element for requesting and receiving secure data, according to some embodiments. Such a user interface element may, for example, be displayed as described in conjunction with 705 of FIG. 7, or before secure data entry is requested. In this example, a window 1101 includes a secure data entry area 1102, which may be indicated by a design element such as the border shown. The secure data entry area 1102 may include information and input fields associated with secure data entry, such as input fields 1103, 1105 and 1107 and submission button 1106. Identity-related information such as a logotype 1104 may be displayed, for example before a SAS is received, or after a SAS is received. In some embodiments, no unauthorized graphics may be permitted within the secure data entry area 1102, which may for example be enforced by disallowing graphics and/or scripts in an HTML form, and/or by disallowing modification of document elements (for example by hiding or protecting elements of the Document Object Model associated with the secure data entry area). In such embodiments, identity-related information such as a requestor name and/or a logotype such as logotype 1104 may be displayed, either before or after a SAS is received. In some embodiments, if no identity-related logotype is provided, a visual indication of the absence of a logotype, such as the words "NO LOGO," may be displayed.

An instructional message 1108 associated with the secure data entry area 1102 may include an instruction to the user regarding entering data securely. Such a message may, for example, include identity-related information such as a requestor name 1109 and/or logotype, and an indication of the SAS 1110.

Figure 12:
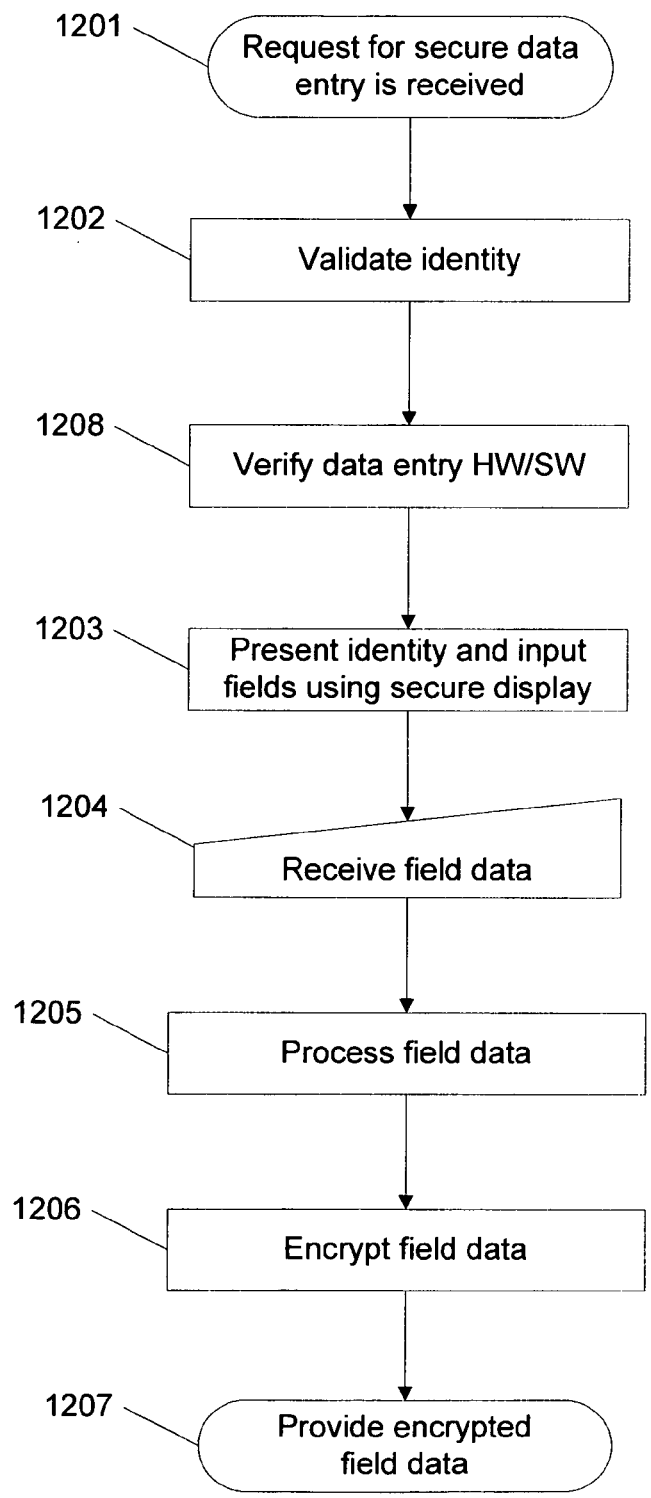
FIG. 12 is a flow diagram of a method for processing a request for secure data entry using a secure display, according to some embodiments.

FIG. 12 is a flow diagram of a method for processing a request for secure data entry using a secure display, according to some embodiments. In this example, a request for secure data entry is received (8zx01). Examples of receiving a request for secure data entry include handling an operating system call, handling a call to a system service, and handling a call to an application program through an API. In some embodiments, a request may have been made as described in conjunction with 603 of FIG. 6. A request may include request data such as information, and/or one or more references to information, relating to identity and to one or more input fields. Examples of input fields and identity-related information such as data destinations and certificate-based proofs of identity are discussed in conjunction with 302 of FIG. 3.

A provided identity and/or other request data may be validated (1202). Examples of validating request data, including an identity, are discussed in conjunction with 303 of FIG. 3.

In some embodiments, software and/or hardware associated with data entry may be verified (1208). Examples of such validation are discussed in conjunction with 309 of FIG. 3.

Figure 13:
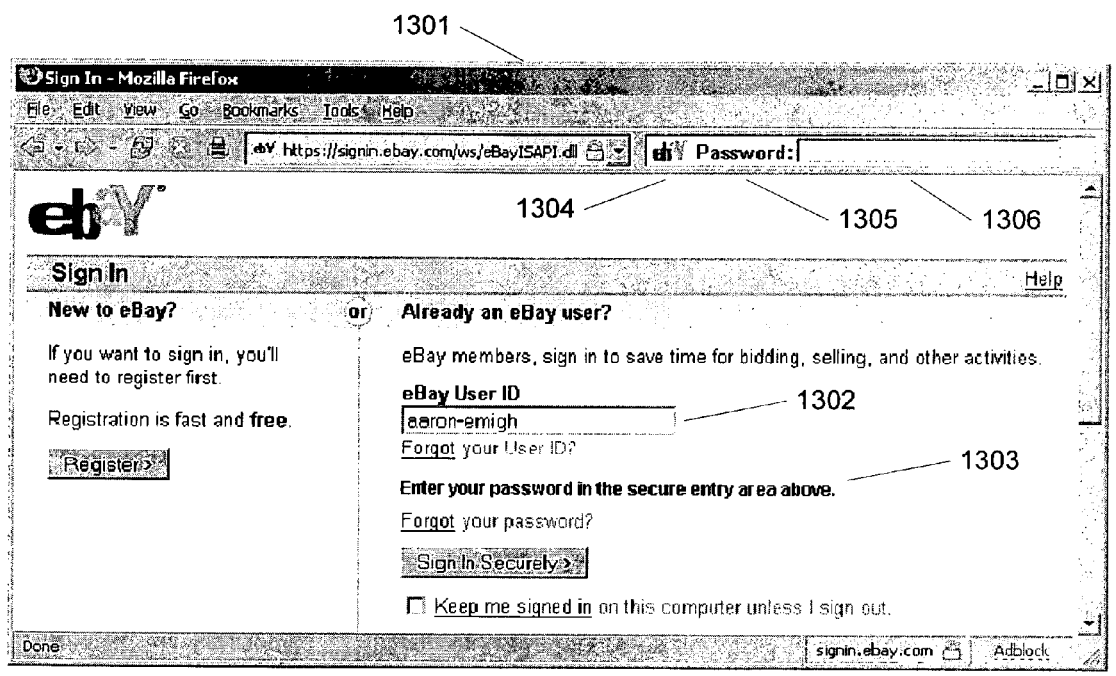
FIG. 13 is an illustrative example of a user interface for secure data entry, according to some embodiments.
Figure 14:
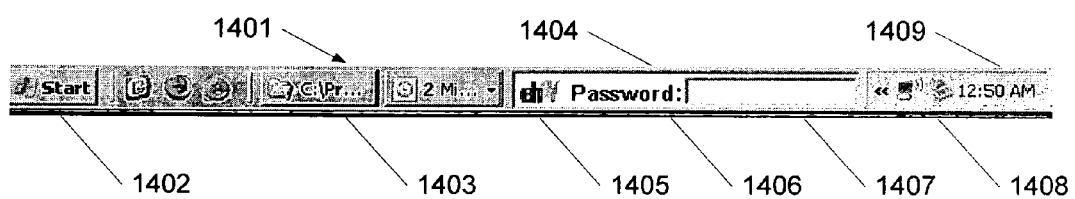
FIG. 14 is an illustrative example of a user interface for secure data entry, according to some embodiments.

Information related to the identity of the requestor and/or data recipient, and one or more input fields, may be presented using a secure display (1203). Such information may be associated with the request data, as discussed in conjunction with 1201. An example of a secure display is a display area reserved by an operating system, for example as illustrated in FIG. 14. Another example of a secure display is a display area reserved by an application program, for example as illustrated in FIG. 13. Another example of a secure display is an external indication of secure data entry, such as an indicator associated with a keyboard, computer or monitor that secure data entry is being performed. In some embodiments, such an external indicator may include identity-related information such as a name or logotype associated with a requestor. A reserved display area may be protected, for example by preventing unauthorized programs or scripts from modifying or overlapping the display area.

Another example of a secure display is a display associated with an external secure data entry device, for example an external secure data entry device 104 of FIG. 1. An example of a display associated with an external data device is illustrated in 1505 of FIG. 15. Examples of an external secure data entry device include a dedicated data device with a display and input capability, and a multifunction data device such as a PDA or cell phone. An external secure data entry device may be communicated with using a direct connection such as a USB port or a network, for example a wireless network such as Bluetooth or 802.11. In some embodiments, processing such as described in this FIG. 12 may be performed using an external secure data entry device, and the initial secure data entry request may be transmitted to an external secure data entry device, for example using an operating system call or a device driver call. In some embodiments, initial validation may be performed on a computer such as user machine 101 of FIG. 1, the validated request may be passed to the external secure data entry device, and processing may continue. In some embodiments, identity validation such as the validation described in conjunction with 1202 may be performed on the external secure data entry device instead of or in addition to validation performed on a user machine such as user machine 101 of FIG. 1.

Information related to identity and one or more input fields may be presented, and an opportunity for data entry may be provided, for example by allowing a user to enter, select and/or manipulate data with one or more input devices such as a keyboard, touchpad and/or a pointing device such as a mouse. Examples of presenting information and allowing user input are discussed in conjunction with 705 of FIG. 7. Field data may be received (1204), for example as discussed in conjunction with 706 of FIG. 7.

Field data may be processed (1205). Examples of processing field data are discussed in conjunction with 708 of FIG. 7. Field data may be encrypted (1206). Examples of encrypting field data are discussed in conjunction with 709 of FIG. 7.

Field data may be securely provided (1207). Examples of securely providing field data are discussed in conjunction with 709 of FIG. 7. In some embodiments, securely providing field data may include transmitting field data, for example encrypted field data, from an external secure data entry device such as external secure data entry device 104 of FIG. 1 to a user machine such as user machine 101 of FIG. 1. In some embodiments, such transmission may occur prior to other processing described in conjunction with 709 of FIG. 7.

FIG. 13 is an illustrative example of a user interface for secure data entry, according to some embodiments. The user interface of FIG. 13 may, for example, be presented as described in conjunction with FIG. 12. In this example, a window 1301 associated with an application such as a browser may include one or more unsecured data fields 1302, and may include instructional text 1303 instructing a user to enter one or more fields in a reserved area 1304. The reserved area 1304 may include identity-related information such as a logotype 1304, and one or more data fields 1306 and associated labels 1305. In this example, the logotype 1304 indicates that data will be securely entered for eBay, and the field 1306 is labeled "Password" 1305.

FIG. 14 is an illustrative example of a user interface for secure data entry, according to some embodiments. The user interface of FIG. 14 may, for example, be presented as described in conjunction with FIG. 12. In this example, an area reserved by the operating system, such as a taskbar 1401, may include an area for secure data entry. In some embodiments, such an area may always be present. In some embodiments, such an area may be dynamically created in a spoof-resistant manner, for example by including it in an area that an application program cannot modify, or cannot modify in an unrestricted manner. In this example, the taskbar 1401 includes normal taskbar information such as a start button 1402, running tasks 1403, system tray icons 1408 and a clock 1409. In addition, a secure data entry area 1404 includes identity-related information such as a logotype 1405, an input field label 1406 and an input field 1407. In this example, the secure data entry is associated with eBay 1405, and the input field 1407 is labeled "Password" 1406. Such a secure data entry area may include an accept button (not shown), or may accept input when a predetermined key such as ENTER is pressed.

Figure 15:
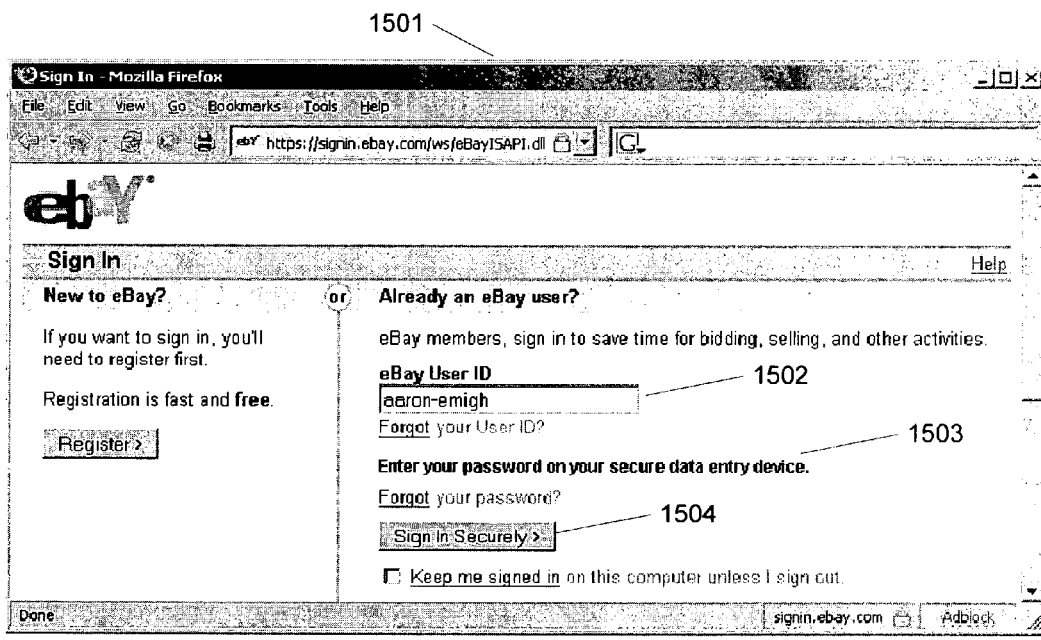
FIG. 15 is an illustrative example of a user interface for secure data entry using an external secure data entry device, according to some embodiments.
Figure 15:
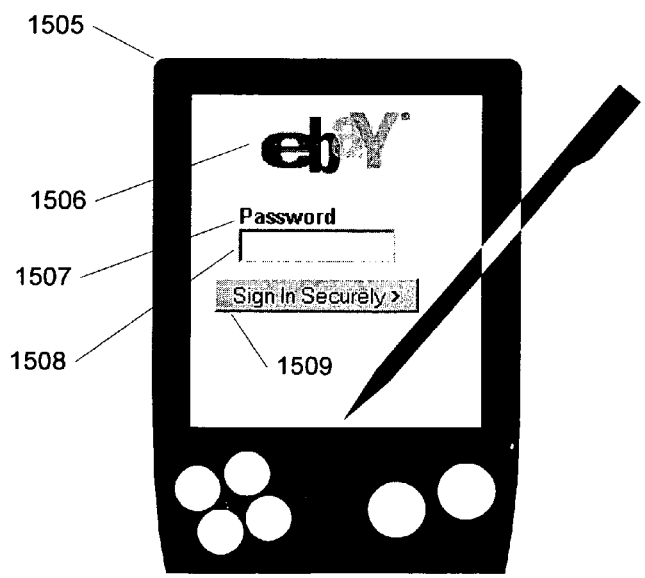

FIG. 15 is an illustrative example of a user interface for secure data entry using an external secure data entry device, according to some embodiments. The user interface of FIG. 15 may, for example, be presented as described in conjunction with FIG. 12. In this example, a window 1501 may contain one or more unsecured data fields 1502, and may contain instructional text 1503 instructing a user to securely enter data on an external device. In some embodiments, an input acceptor 1504 may be provided.

An external device 1505, such as the external secure data entry device 104 of FIG. 1, may include a user interface. In some embodiments, an external device 1505 may request and receive a secure attention sequence, for example as described in conjunction with FIG. 7. An example of such a user interface is described in conjunction with FIG. 9. In the example of this FIG. 15, a user interface associated with the external device 1505 includes identity-related information such as a name and/or logotype 1506, and one or more input fields 1508 and associated labels 1507. In some embodiments, a user interface associated with an external device 1505 may include an input acceptor 1509. In some embodiments, when an input acceptor 1509 is selected, secure data may be transmitted to the secure data requestor. In some embodiments, when secure data is transmitted to the secure data requestor, data may automatically be processed by the requestor and processing may proceed to the next step, for example by submitting a form on a web page and receiving and displaying a new web page. In some embodiments, a user interface associated with an external secure data entry device 1505 may include an element such as a "cancel" button (not shown), which may terminate secure data entry.

Figure 16:
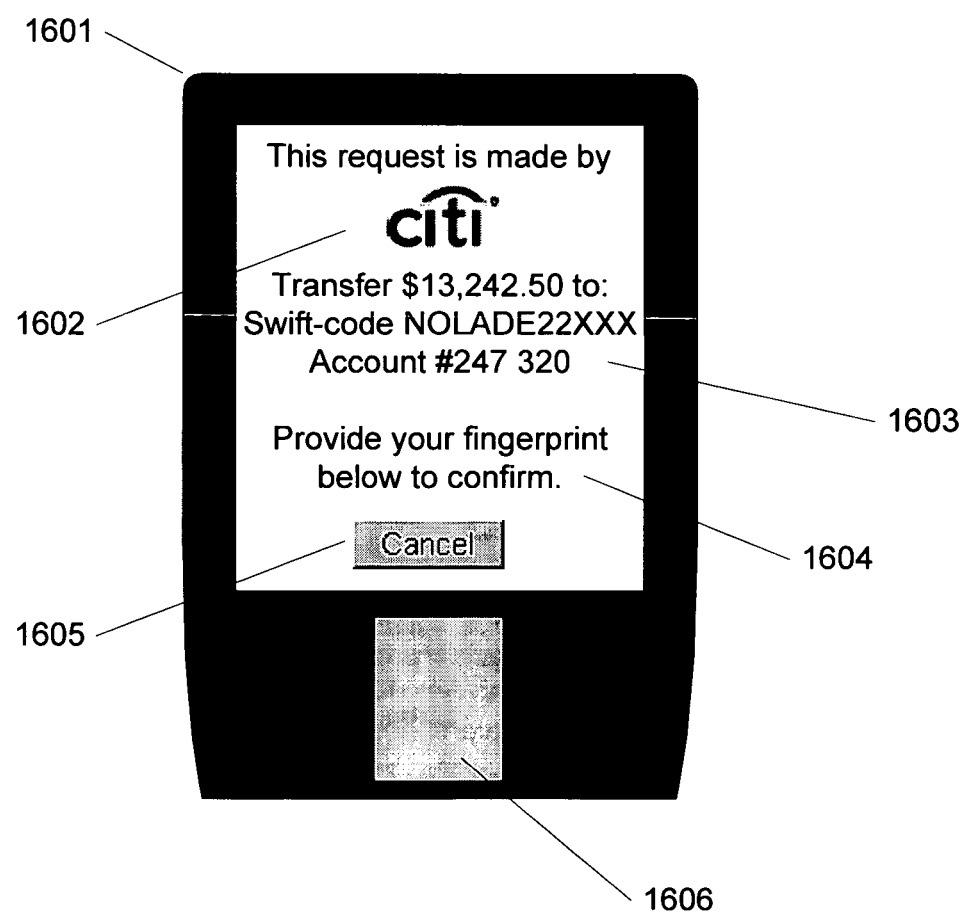
FIG. 16 is an illustrative example of an external trusted device incorporating a biometric sensor, according to some embodiments.

FIG. 16 is an illustrative example of an external trusted device incorporating a biometric sensor, according to some embodiments. In this example, an external device 1601 includes a display area and a biometric sensor 1606. An example of a biometric sensor is a fingerprint sensor. Another example of a biometric sensor is a microphone for use in voice identity verification. Another example of a biometric sensor is an imaging device, such as a lens and CCD, for use in facial feature analysis and/or retinal scanning. An external device 1601, such as the external secure data entry device 104 of FIG. 1, may include a user interface. An example of such a user interface is described in conjunction with FIG. 9. In the example of this FIG. 16, a user interface associated with the external device 1601 includes identity-related information such as a name and/or logotype 1602, and transactional information 1603. Such a user interface may, for example, be presented to enable approval or disapproval of a transaction.

In some embodiments (not shown), one or more input fields and associated labels may be displayed. In some embodiments (not shown), a data recipient may be validated, for example as described in conjunction with 306 of FIG. 3 or 707 of FIG. 7 and/or as illustrated in conjunction with FIG. 10. In some embodiments (not shown), data subject to pre-encryption may be indicated, for example as described in conjunction with 304 of FIG. 3. In some embodiments, a user interface associated with an external device 1601 may include a prompt 1604 instructing the user to use the biometric sensor 1606. In some embodiments, a user interface associated with the external device may include an input acceptor in the user interface. In some embodiments, a biometric sensor 1606 may act as an input acceptor. In some embodiments (not shown), a separate input acceptor, such as a button on a user interface, may be provided. In some embodiments, when an input acceptor is selected, secure data may be transmitted to the secure data requestor. In some embodiments, biometric data associated with the biometric sensor 1606 may be included in the secure data. In some embodiments, biometric data may include a response to one or more challenges, such as identifying information associated with specified propertie(s) of a fingerprint. In some embodiments, secure data may be cryptographically signed, for example using a key stored on the device 1601.

In some embodiments, when secure data is transmitted to the secure data requestor, data may automatically be processed by the requestor and processing may proceed, for example by submitting a form on a web page and receiving and displaying a new web page. In some embodiments, a user interface associated with an external secure data entry device 1601 may include an element such as a "cancel" button 1605, which may terminate secure data entry.

In some embodiments, an external device such as biometric device 1601 may be associated with a telephonic device such as a cellular phone. Such a device may, for example, be addressed via a message such as an SMS or MMS message. In some embodiments, such a device may be treated as a "what you have" authentication factor in such cases. In some embodiments, such a device may include a biometric sensor such as biometric sensor 1606, which may be treated as a "what you are" authentication factor. In some embodiments, such a device may include a cryptographic key for signing, which may in various embodiments be treated as a "what you have" or "what you know" authentication factor. In some embodiments, such a device may receive a password, which may be treated as a "what you know" authentication factor. The use of "what you have," "what you are" and "what you know" authentication factors, separately or in combination, are well known to those skilled in the art.

Figure 17:
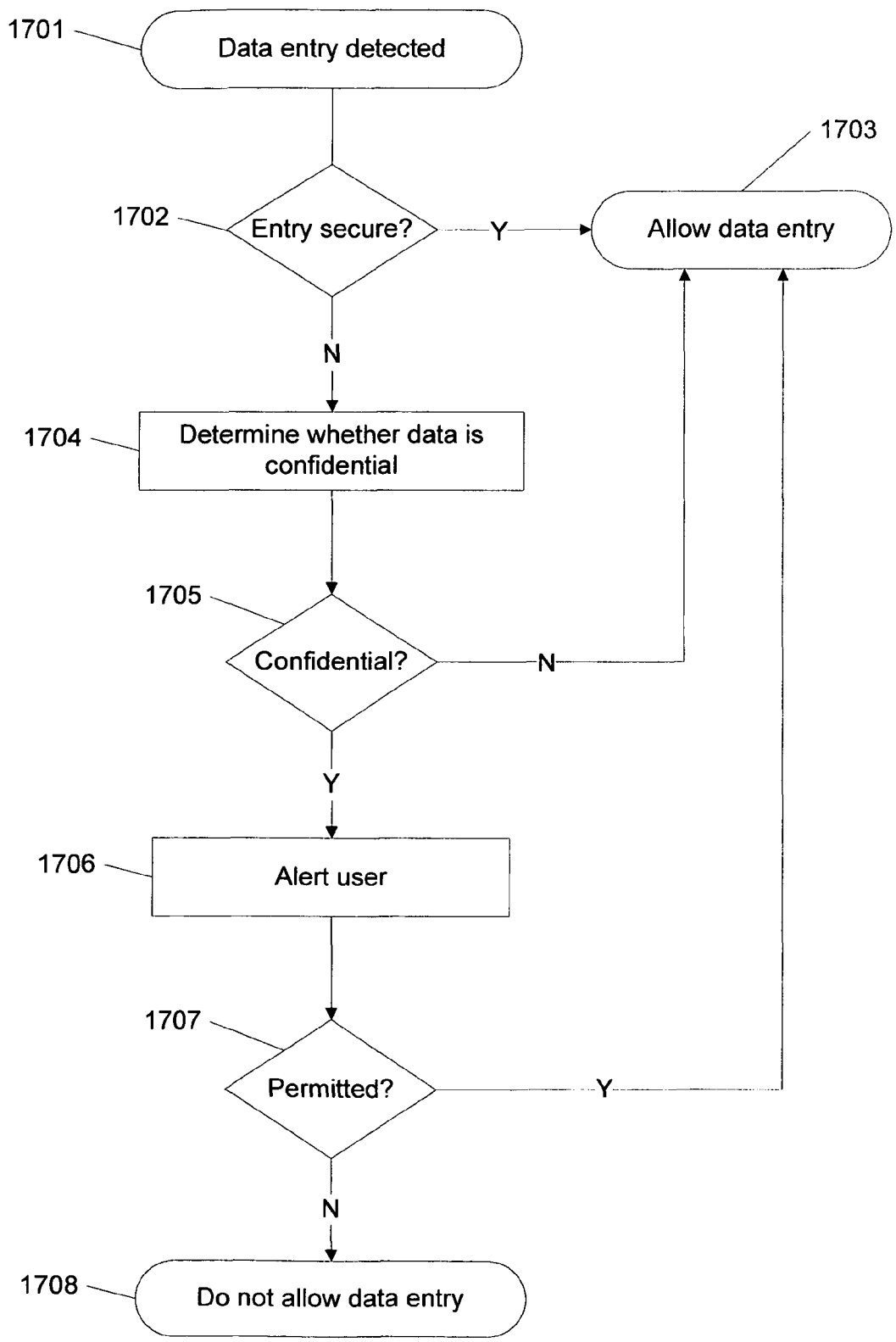
FIG. 17 is a flow diagram of a method for selectively monitoring data entry, according to some embodiments.

FIG. 17 is a flow diagram of a method for selectively monitoring data entry, according to some embodiments. In this example, data entry is detected (1701). An example of detecting data entry is to determine that a browser is receiving data, for example at a browser component such as a browser helper object, or by determining at an input device driver such as a keyboard driver that input is being directed toward a browser or other protected application. In various embodiments, data input may be detected in entirety, such as when a field is filled in or a form is submitted, or on an input-by input basis such as a keystroke-by-keystroke basis. In some embodiments, data input may be hidden and/or substituted with other input pending analysis, for example as described in Blake Ross, Nick Miyake, Robert Ledesma, Dan Boneh and John Mitchell, "A 'Simple' Solution to the Unique Password Problem," presented at the 2004 Annual Stanford Affiliates' Meeting and available from Stanford University.

It may be determined whether the data entry is secure (1702). An example of determining whether data entry is secure is to determine whether data entry is being directed toward a trusted path, for example as described in conjunction with FIGS. 3 and 7. If it is determined that data entry is secure (1702), then in this example data entry is allowed (1703). An example of allowing data entry is to pass keystrokes through.

If it is determined that data entry is not secure (1702), then in this example it is determined whether data being entered is confidential (1704). One example of confidential information is information that is related to information separately designated as confidential, such as stored account names, passwords, credit card numbers, bank account numbers, social security numbers, etc. Another example of confidential information is information related to information that has previously been entered into secure input fields. One example of a secure input field is an input field associated with Trusted Path, for example any input field or an input field designated as confidential, for example by a tag associated with the field within an HTML form. Another example of a secure input field is an input field in a form that is a password type field. In some embodiments, certain information previously entered into a Trusted Path field may not be considered confidential information, such as a user's name, address, or similar identifiable non-sensitive information, or information that has previously been questioned and allowed to be transmitted via a non-trusted mechanism.

One example of determining whether an input is confidential is to determine whether it matches an entire stored confidential datum. Another example of determining whether an input is confidential is to determine whether it matches a partial stored confidential datum, for example a prefix of a stored confidential datum with a minimum length, such as three characters, four characters or five characters.

If it is not determined that information being entered is confidential (1705), then in this example data entry is allowed (1703). In some embodiments, further analysis may be performed as described in conjunction with 1704 as one or more additional inputs such as keystrokes are received.

If it is determined that information being entered is confidential (1705), then in this example an alert is presented to the user (1706). An example of an alert is a user interface element such as a dialog box. In some embodiments, an alert may include an advisory notice that the information is not being protected, and may in some embodiments include an option to cancel the input and/or submit or continue the input. In some embodiments, if input is submitted or continued, the information entered may subsequently be considered non-confidential, and/or there may be a user interface option for the user to select this as an option.

If an election is made to permit the input (1707), then in this example data entry is allowed (1703). If an election is made to disallow the input (1707), then in this example data entry is not allowed (1708). An example of disallowing data entry is to modify data entry to remove or modify the confidential information.

Figure 18:
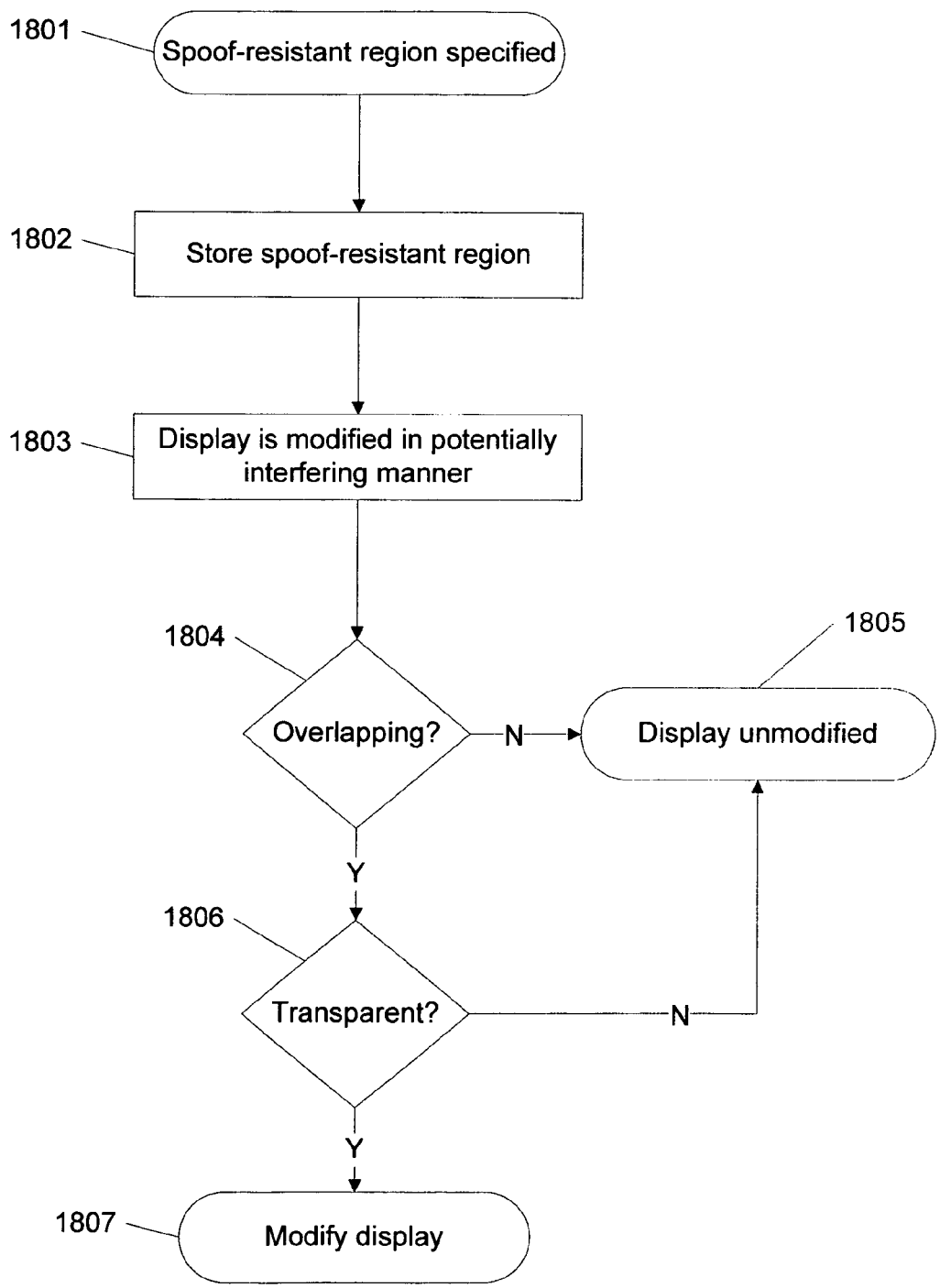
FIG. 18 is a flow diagram of a method for preventing visual spoofing, according to some embodiments.

FIG. 18 is a flow diagram of a method for preventing visual spoofing, according to some embodiments. In some embodiments, the method of this FIG. 18 may be used to protect sensitive information such as an input area associated with trusted path. In this example, a spoof-resistant region is specified (1801). Examples of a spoof-resistant region include an area of a computer screen and an area of a window to be displayed on a computer screen. An example of specifying a spoof-resistant region is to include a specification of a spoof-resistant region in a call to create, modify or display a window.

The spoof-resistant region may be stored (1802). An example of storing the spoof-resistant region is to optionally translate the region into absolute screen coordinates associated with the display of the region, and keep that information in memory. In some embodiments, when a window associated with a spoof-resistant region is moved, minimized, closed or otherwise altered, stored information associated with the spoof-resistant region may be updated accordingly.

It may be determined that the display has been altered in a manner that may potentially interfere with the spoof-resistant region (1803). Examples of display modifications that may potentially interfere with the spoof-resistant region include opening a new window, and resizing or moving an existing window. It may be determined whether the display alteration overlaps with the spoof-resistant region (1804). An example of determining whether the display alteration overlaps with the spoof-resistant region is to determine whether the display alteration is to be rendered on top of, or partially on top of, part or all of the spoof-resistant region. If it is determined that the display alteration does not overlap with the spoof-resistant region (1804), then in this example the display is allowed to be updated without modification (1805).

If it is determined that the display alteration overlaps with the spoof-resistant region (1804), then in this example it is determined whether the display alteration includes the rendering of partially or wholly transparent information, either in any place or associated with a spoof-resistant region (1806). An example of transparent information is information that is specified to be transparent, or more transparent than an opacity threshold, such as 0% or 50%. An example of an object that may include transparent information is a completely or partially transparent or translucent window, which may in some cases also include opaque information. If it is determined that the display alteration does not include the rendering of transparent information (1806), then in this example the display is allowed to be updated without modification (1805).

If it is determined that the display alteration includes the rendering of partially or wholly transparent information (1806), then in this example the display is modified (1807). An example of modifying the display is to increase the opacity of the display alteration, for example to a predetermined threshold such as 50% or 100%. In some embodiments, such modification may be performed for a part of the display, for example a part that overlaps with a spoof-resistant region. Another example of modifying the display is to not display on top of the spoof-resistant region.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor-based method for computer security, comprising:
   receiving a request for secure data entry;
   wherein the request is associated with a first data recipient;
   receiving a selection of a second data recipient, wherein receiving the selection of the second data recipient includes displaying a first candidate associated with the first data recipient and a second candidate associated with a third data recipient, and receiving a selection corresponding to one of the first candidate and the second candidate, wherein the second data recipient is the first data recipient when the selection corresponds to the first candidate and wherein the second data recipient is the third data recipient when the selection corresponds to the second candidate;
determining whether the second data recipient is the first data recipient; and
denying the request for secure data entry, if it is determined that the second data recipient is not the first data recipient.

2. The method of claim 1, wherein the request is associated with a secure attention sequence.

3. The method of claim 1, wherein the request is associated with a trusted device.

4. The method of claim 1, further comprising receiving a user input, and further comprising processing the user input, if it is determined that the first data recipient is substantially similar to the second data recipient.

5. The method of claim 1, wherein receiving the selection of the second data recipient includes receiving a user input.

6. The method of claim 1, wherein the second candidate is similar to the first candidate.

7. The method of claim 1, wherein the second candidate is associated with a previous secure data entry operation.

8. The method of claim 1, implemented as a credential provider.

9. The method of claim 1, wherein the first data recipient is associated with a proof of identity.

10. The method of claim 1, wherein the first data recipient is associated with a data destination.

11. A system for computer security, comprising:
a processor configured to:
receive a request for secure data entry;
wherein the request is associated with a first data recipient;
receive a selection of a second data recipient, wherein receiving the selection of the second data recipient includes displaying a first candidate associated with the first data recipient and a second candidate associated with a third data recipient, and receiving a selection corresponding to one of the first candidate and the second candidate, wherein the second data recipient is the first data recipient when the selection corresponds to the first candidate and wherein the second data recipient is the third data recipient when the selection corresponds to the second candidate;
determine whether the second data recipient is the first data recipient; and
deny the request for secure data entry, if it is determined that the second data recipient is not the first data recipient; and
a memory coupled with the processor, wherein the memory provides instructions to the processor.

12. The system of claim 11, wherein the request is associated with a secure attention sequence.

13. The system of claim 11, wherein receiving the selection of the second data recipient includes receiving a user input.

14. The system of claim 11, wherein the request is associated with a trusted device.

15. The system of claim 11, wherein the processor is further configured to receive a user input, and wherein the processor is further configured to process the user input, if it is determined that the first data recipient is substantially similar to the second data recipient.

16. The system of claim 11, wherein the second candidate is similar to the first candidate.

17. The system of claim 11, wherein the second candidate is associated with a previous secure data entry operation.

18. The system of claim 11, implemented as a credential provider.

19. The system of claim 11, wherein the first data recipient is associated with a proof of identity.

20. The system of claim 11, wherein the first data recipient is associated with a data destination.

21. A computer program product for computer security, the computer program product being embodied in a non-transitory computer readable storage medium and comprising computer instructions for:
receiving a request for secure data entry;
wherein the request is associated with a first data recipient;
receiving a selection of a second data recipient, wherein receiving the selection of the second data recipient includes displaying a first candidate associated with the first data recipient and a second candidate associated with a third data recipient, and receiving a selection corresponding to one of the first candidate and the second candidate, wherein the second data recipient is the first data recipient when the selection corresponds to the first candidate and wherein the second data recipient is the third data recipient when the selection corresponds to the second candidate;
determining whether the second data recipient is the first data recipient; and
denying the request for secure data entry, if it is determined that the second data recipient is not the first data recipient.

22. The computer program product of claim 21, wherein the request is associated with a secure attention sequence.

23. The computer program product of claim 21, wherein the request is associated with a trusted device.

24. The computer program product of claim 21, further comprising receiving a user input, and further comprising processing the user input, if it is determined that the first data recipient is substantially similar to the second data recipient.

25. The computer program product of claim 21, wherein receiving the selection of the second data recipient includes receiving a user input.

26. The computer program product of claim 21, implemented as a credential provider.

27. The computer program product of claim 21, wherein the second candidate is similar to the first candidate.

28. The computer program product of claim 21, wherein the second candidate is associated with a previous secure data entry operation.

29. The computer program product of claim 21, wherein the first data recipient is associated with a proof of identity.

30. The computer program product of claim 21, wherein the first data recipient is associated with a data destination.

* * * * *